United States Patent [19]
Burdick

[11] 3,818,341

[45] June 18, 1974

[54] APPARATUS FOR PROVIDING OUTPUT INDICATIONS RESPONSIVE TO THE MOVEMENT OF A MOVING BODY

[76] Inventor: Neal M. Burdick, 1442 N. W. 45th St., Oklahoma City, Okla. 73118

[22] Filed: Oct. 2, 1972

[21] Appl. No.: 294,380

[52] U.S. Cl.............. 324/163, 73/491, 273/184 B
[51] Int. Cl. .............................................. G01p 3/46
[58] Field of Search .......... 324/161, 162, 163, 165, 324/158 MG; 73/12, 35, 167, 178 T, 491, 492; 235/150.22, 151.32; 273/184 B, 185 D

[56] References Cited
FOREIGN PATENTS OR APPLICATIONS
| 214,211 | 10/1968 | U.S.S.R. | 324/163 |
| 801,383 | 12/1968 | Canada | 32/163 |

*Primary Examiner*—Michael J. Lynch
*Attorney, Agent, or Firm*—Dunlap, Laney, Hessin, Dougherty & Codding

[57] ABSTRACT

The present invention contemplates an improved indicator apparatus receiving an input signal from a transducer generated via the movement of a portion of the transducer within a magnetic field, sensing the movement of the portion of the transducer a predetermined distance and developing a sample signal in response thereto, and holding and displaying the developed sample signal, the indicator apparatus integrating the received, input signal and developing the sample signal in response to a sensed, integrated input signal of a predetermined minimum value. The indicator apparatus also generates a trigger signal indicating the development of the sample signal and a control preventing the development of subsequent sample signals until the indicator apparatus is reset. In one form, the indicator apparatus is particularly useful for indicating the velocity of a moving object such as a golf club head or the like, the moving object striking and moving the portion of the transducer to develop the input signal and the developed sample signal being indicative of the velocity of the moving object. In one aspect, the present invention also contemplates an improved active filter providing a relatively high input impedance to differential signals received thereby and providing a relatively low input impedance to common mode signals received thereby, the active filter network receiving and filtering the input signals received via the indicator apparatus. In one other aspect, the present invention also contemplates an improved low pass filter network providing a relatively high impedance to common mode signals and a relatively low impedance to differential signals, the low pass filter network being utilized to filter the input signals received via the indicator apparatus.

28 Claims, 12 Drawing Figures

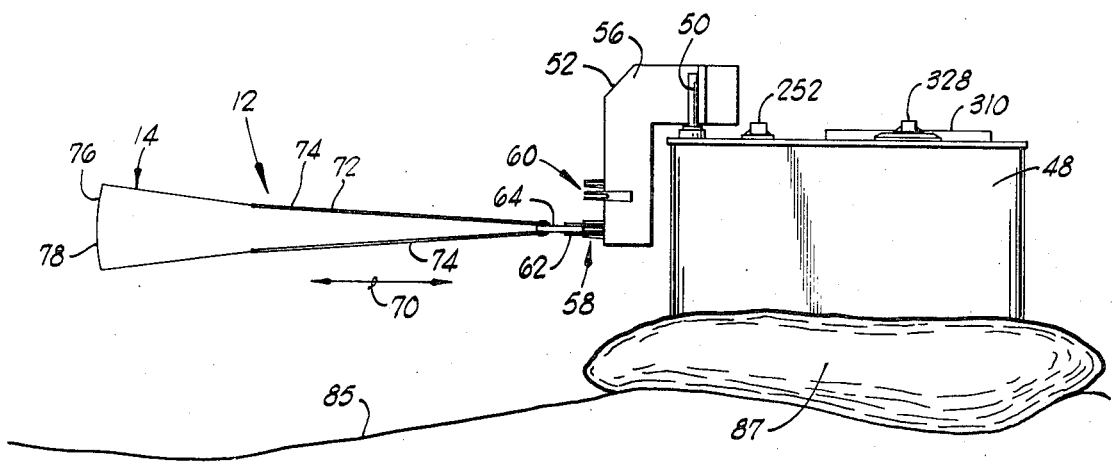
FIG. 2
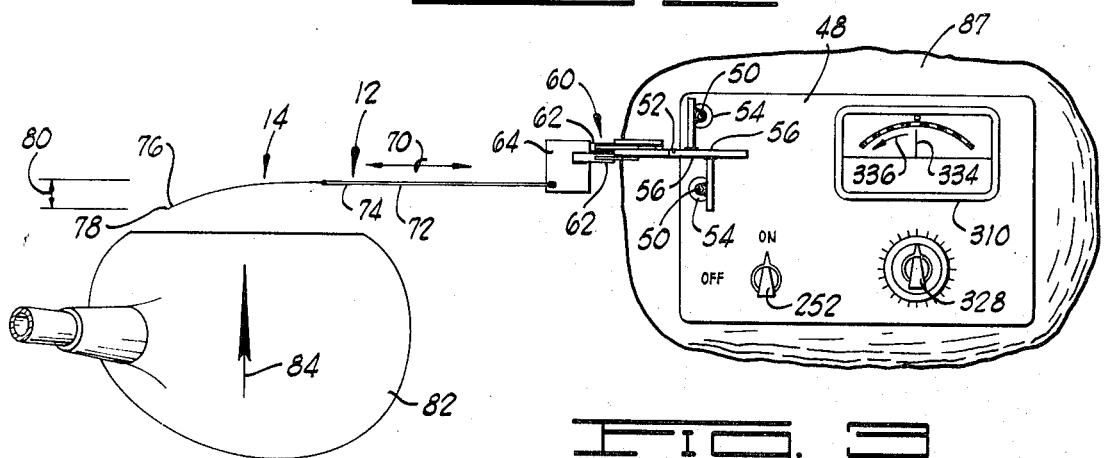
FIG. 3
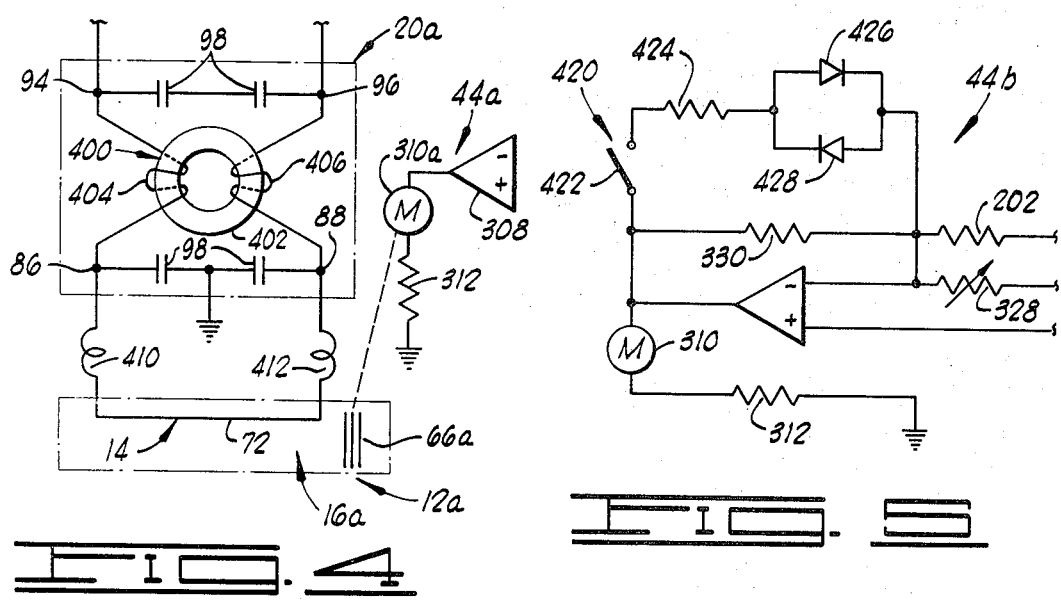
FIG. 4
FIG. 5

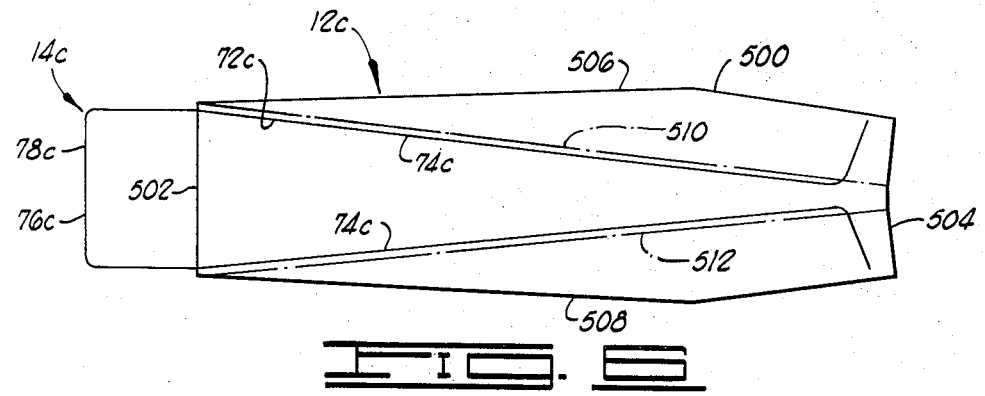
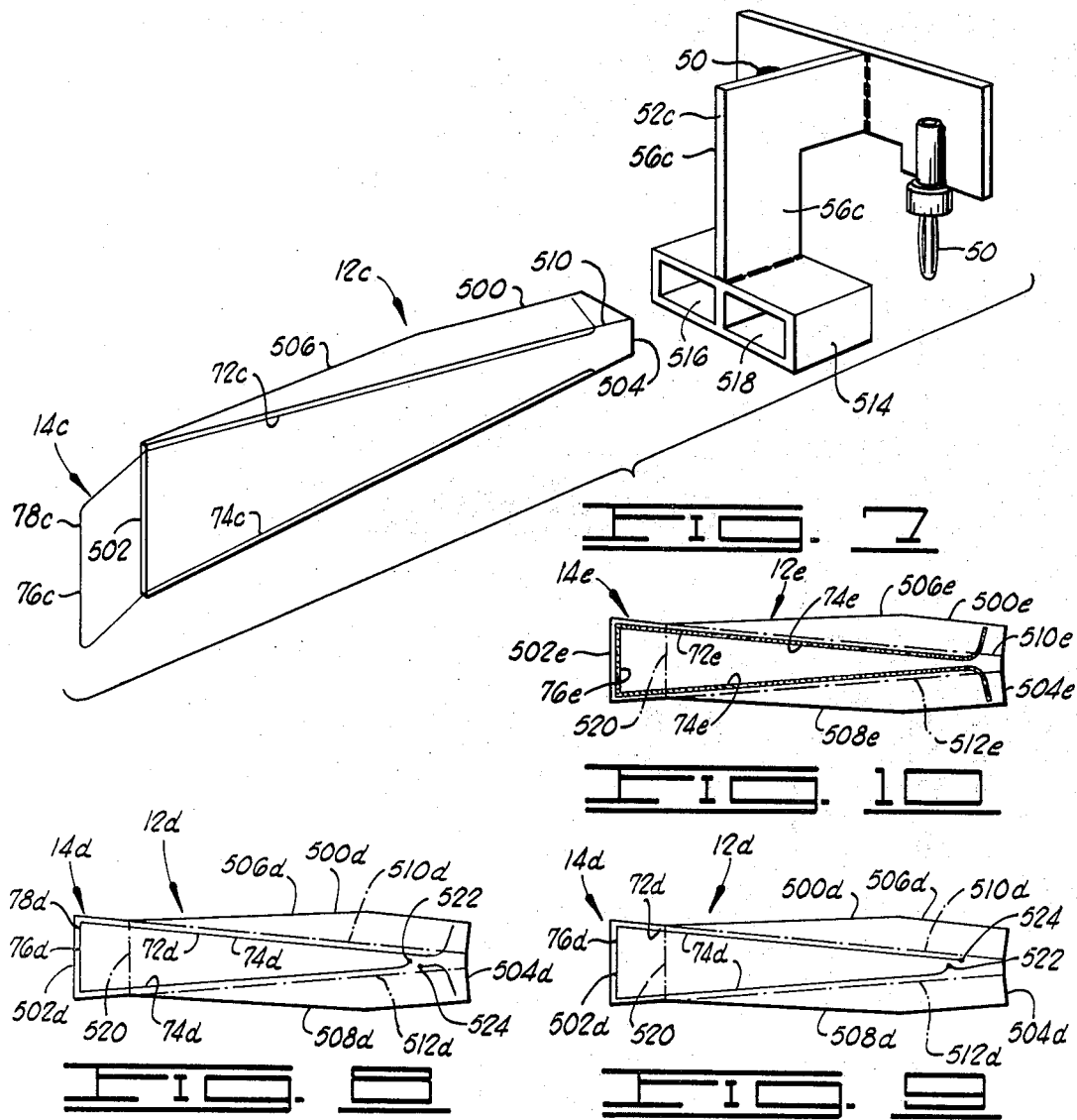

APPARATUS FOR PROVIDING OUTPUT INDICATIONS RESPONSIVE TO THE MOVEMENT OF A MOVING BODY

BACKGROUND OF THE INVENTION

1. Field of the Invention

This invention relates generally to improvements in indicator devices and, more particularly, but not by way of limitation, to an improved indicator apparatus sensing the velocity of a moving object and providing an output indication indicative thereof.

2. Brief Description of the Prior Art

In the past, various devices have been constructed for sensing the velocity of a golf club head or golf ball and providing output indications indicative of the sensed velocity. One such device was disclosed in the U.S. Pat. No. 3,513,387, issued to Mayeda, wherein a pair of spaced actuator elements were mounted in a base and supported to be struck by the head of the golf club, the period of time between the closure of the first actuator element and the closure of the second actuator element being utilized to indicate the velocity of the club head striking the two actuator elements. The golf club speed indicator of the Mayeda patent included a control or timing circuit which was actuated via the contact closure of the first actuator element and terminated via the contact closure of the second actuator element, the time interval between the two contact closures being compared with a predetermined value to provide an output indication indicative of the comparison. A similar apparatus was disclosed in the U.S. Pat. No. 2,933,681, issued to Crane, wherein two spring-biased levers were struck by a golf club head and a meter connected between the two levers provided the output indication indicative of the velocity of the golf club head.

The U.S. Patents: No. 2,157,572, issued to Roberts; No. 2,174,804, issued to Neville; No. 3,416,079, issued to Burger; and No. 3,633,007, issued to Sanders, each disclosed an apparatus constructed to provide output indications relative to the speed or direction of movement of a golf ball, the various output indications being generated when a surface was struck by the golf ball, some of the devices providing an output indication of the golf ball velocity and the golf ball trajectory, for example.

The U.S. Pat. No. 3,373,612, issued to Thompson, disclosed a mechanical golfer which was utilized to test golf clubs, the apparatus disclosed in the Thompson patent utilizing photoelectric elements to determine the velocity and position of the golf club head. The U.S. Pat. No. 3,601,408, issued to Wright, also utilized a photoelectric type of circuitry to measure various characteristics of the swing of a golf club and for indicating the projected flight of the golf ball.

The U.S. Pat. No. 3,270,564, issued to Evans, disclosed a golf club velocity measuring apparatus wherein an accelerometer was disposed in the golf club head, a pair of strain gauges were disposed in the golf club handle, a plurality of transmitters were located in the golf club handle and a battery was supported in the top of the golf club handle, the information provided via the accelerometer and the strain gauges being transmitted to a receiving apparatus for analyzing the various data indicated thereby.

The U.S. Pat. No. 2,283,277, issued to Modine, disclosed a golf club swing indicator utilizing one or more solenoids and a magnet embedded in the golf club head, the magnet inducing a current in the solenoids as the golf club head was passed over the solenoids to provide an output indication of the golf club path of travel.

SUMMARY OF THE INVENTION

An object of the invention is to provide an improved apparatus for sensing the velocity of a moving object in a faster, more efficient and more economical manner.

Another object of the invention is to provide an apparatus for indicating the velocity of a moving object in a faster, more efficient and more economical manner.

One other object of the invention is to provide an improved apparatus for determining the velocity of a transducer moving through a magnetic field in a more efficient and more economical manner.

Another object of the invention is to provide an improved apparatus for indicating the velocity of a golf club head.

Yet another object of the invention is to provide an improved low pass filter network.

Still another object of the invention is to provide an improved active filter network.

A still further object of the invention is to provide an improved transducer and transducer support which is more efficient and economical in the construction and the operation thereof.

One other object of the invention is to provide an improved control circuit for receiving an input signal and developing a sample signal indicative thereof in response to a predetermined, sensed condition in a faster, more efficient and more economical manner.

A further object of the invention is to provide an improved velocity indicating apparatus which is economical in the construction and the operation thereof.

Other objects and advantages of the invention will be evident from the following detailed description when read in conjunction with the accompanying drawings which illustrate the varius embodiments of the invention.

BRIEF DESCRIPTION OF THE DRAWINGS

FIG. 2 is a side elevational view of the indicator apparatus of the present invention having a transducer supportably connected thereto.

FIG. 3 is a plan view of the indicator apparatus of FIG. 2, showing a portion of the golf club head moving toward striking engagement with a portion of the transducer.

FIG. 4 is a partial, diagrammatic, schematic view of a modified indicator apparatus having a modified low pass filter network and a modified means for producing the magnetic field.

FIG. 5 is a partial, schematic, diagrammatic view showing a modified meter network which can be utilized in the indicator apparatus of FIG. 1.

FIG. 6 is a top plan view of a modified transducer and a loop support therefor, which can be utilized in an indicator apparatus, similar to the indicator apparatus shown in FIGS. 1 through 3.

FIG. 7 is a diagrammatic, perspective view showing the modified transducer of FIG. 6 in a folded, assembled position, and a modified support for receiving the modified transducer.

FIG. 8 is a diagrammatic, plan view, similar to FIG. 6, but showing another modified transducer.

FIG. 9 is a bottom view of the transducers of FIG. 8.

FIG. 10 is a diagrammatic, top plan view, similar to FIG. 6, but showing still another modified transducer.

DESCRIPTION OF THE PREFERRED EMBODIMENT

Figure 1:
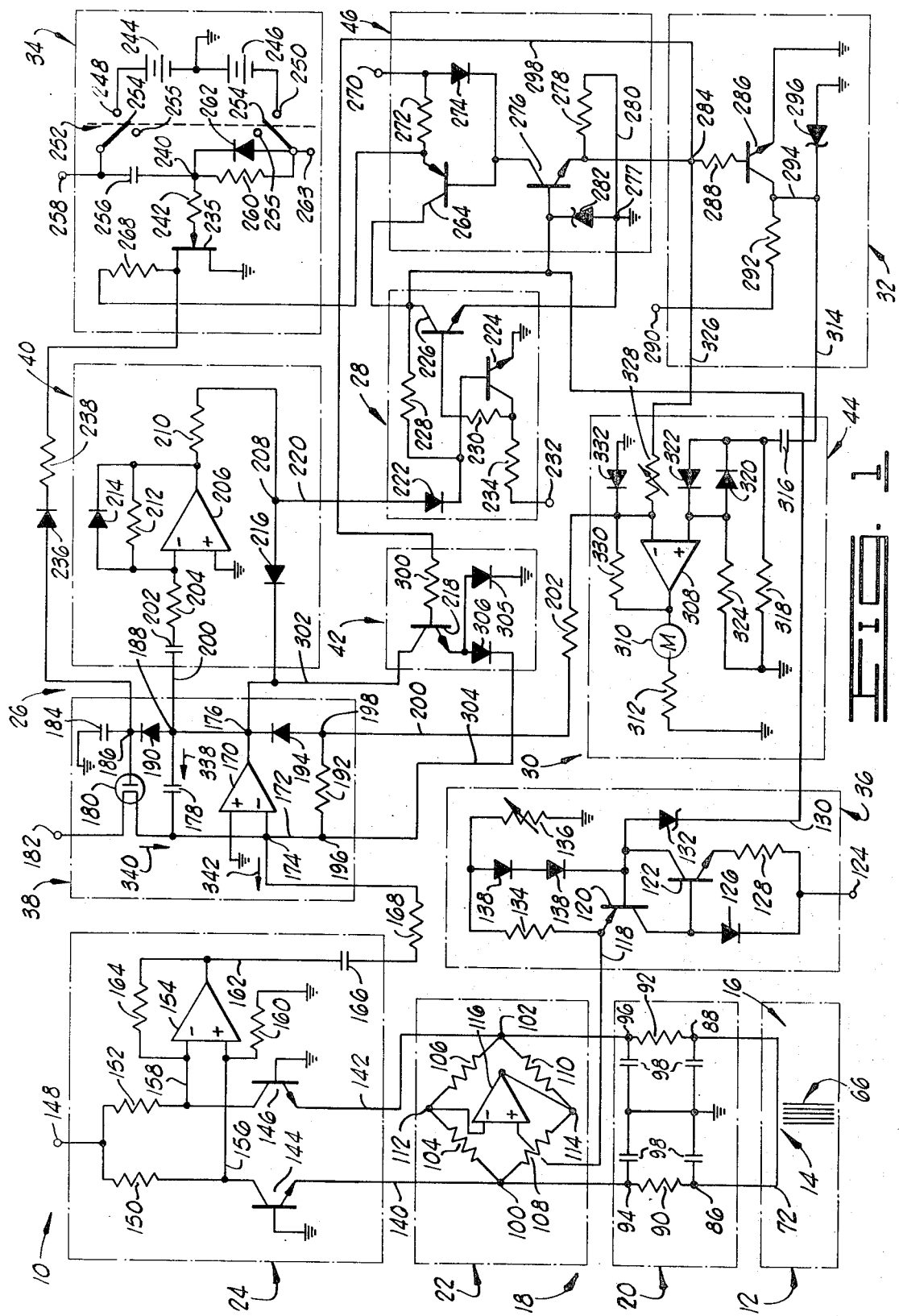
FIG. 1 is a schematic, diagrammatic view of the indicator apparatus of the present invention.

Referring to the drawings in general, and to FIG. 1 in particular, shown therein and designated by the general reference numeral 10 is an indicator apparatus providing a convenient, economical, efficient and, in one form, portable apparatus for sensing a parameter, condition, status or the like and providing an output indication indicative of the sensed parameter, condition, status or the like. The indicator apparatus 10 is particularly suitable for indicating the velocity of a moving object such as a golf club, a golf ball or the like, for example. It should be noted that, although the indicator apparatus 10 will be described below with specific reference to a velocity indicating type of apparatus, as mentioned above, the indicator apparatus 10 and various aspects thereof are suitable for other applications, as will be made more apparent below.

As shown in FIG. 1, the indicator apparatus 10 includes a transducer 12 having a sensor 14 constructed and positioned to sense the parameter to be measured or indicated and, in one form, a signal transducer 16 connected to the sensor 14 generating an input electrical signal responsive to and indicative of the parameter sensed by the sensor 14 or, in a preferred embodiment, the velocity of the moving object striking the sensor 14. The input signal produced via the transducer 12 is connected to a filter network 18, including low pass filter network 20 and an active filter network 22, and to an amplifier network 24, the filtered and amplified input signal from the amplifier network 24 being connected to a delay and sample network 26. The transducer 12 is, more particularly, constructed to sense the velocity of a moving object and generate an input signal in response thereto, for reasons and in a manner to be made more apparent below.

In general, the delay and sample network 26 is constructed to receive the input signal generated via the transducer 12, to sense that a portion of the transducer 12 has been moved a predetermined distance or, more particularly, to sense the integral of the input signal and to develop a sample signal and a trigger signal in response to a sensed integrated input signal of a predetermined minimum value. The developed sample signal is held via the indicator apparatus 10 and the developed trigger signal is utilized to indicate that the sample signal has been developed via the delay and sample network 26, in a manner and for reasons to be described in greater detail below.

Referring more specifically to the indicator apparatus 10 constructed to provide an output indication indicative of the velocity of a moving object, the delay and sample network 26 receives the input signal generated via the transducer 12 and senses that a portion of the transducer 12 has been moved a predetermined distance via the moving object, the delay and sample network 26 sensing the integral of the input signal and developing a sample signal indicative of the velocity of the moving object in response to a sensed integrated input signal of a predetermined minimum value or, more particularly, in response to a sensed integrated input signal shift from an initial predetermined value to a predetermined minimum value. In this embodiment of the invention, the trigger signal generated via the delay and sample network 26 indicates that a sample signal proportional to the input signal and indicative of the velocity of the moving object has been developed via the delay and sample network 26. The developed sample signal is held in the indicator apparatus 10 until the indicator apparatus 10 has been reset to receive subsequent input signals and develop subsequent samples in response thereto in a manner generally described before. The trigger signal from the delay and sample network 26 is connected to and received by a control signal generator 28 which is constructed to generate or produce a control signal in response to the received trigger signal.

The indicator apparatus 10 is, in one preferred form, constructed to be positioned in what is sometimes referred to herein as a "sampled position" wherein the various components and assemblies are positioned to substantially prevent or block subsequent sampling of input signals induced therein via the transducer 12 after the initiation of the control signal or, in other words, after the delay and sample network 26 has sensed an integrated input signal of a predetermined value. The indicator apparatus 10 remains in the sampled position until reset for receiving, sampling and indicating subsequently induced input signals, in a manner and for reasons to be made more apparent below.

The sample signal proportional to the velocity of the moving object striking the sensor 14 developed in the delay and sample network 26 is connected to an output indicator 30. The output indicator 30 is connected to the delay and sample network 26 and to the control signal generator 28, the output indicator 30 being constructed to provide an operator-perceivable output indication indicative of the sample signal or, in other words, indicative of the velocity of the moving object in response to the received sample signal from the delay and sample network 26. The output indicator 30 also provides output indications indicating the development of the sample signal and indicating the resetting of the indicator apparatus 10 for receiving subsequently induced input signals in a manner to be described in greater detail below. The operator-perceivable output indications of the output indicator 30 can take the form of a digital type read-out, a recording on a chart or the like, a meter needle position relative to a meter scale or, in one preferred form, a dial indication of a null type meter or various combinations of the mentioned indications, the last-mentioned form of output indication being shown in FIG. 1 and being described in greater detail below.

In one preferred embodiment, shown in FIG. 1, the indicator apparatus 10 and, more particularly, the output indicator 30 includes a sample indicator 32 having a portion connected to the control signal generator 28 receiving the control signal therefrom and cooperating to provide operator-perceivable output indications indicative that the indicator apparatus 10 has been turned on and reset, or that the sample signal has been developed and the indicator apparatus 10 has been positioned to provide additional operator-perceivable output indications via the output indicator 30 indicative of the velocity of the moving object. The operator-perceivable output indication produced via the sample indicator 32 can take the form of a light indicator such as via a light emitting diode or the like when indicating that the indicator apparatus 10 has been turned on and reset or that the sample signal has been developed, or via a meter needle position or movement or the like, or via a light and digital read-out, for example. The indicator apparatus 10, as shown in FIG. 1, more particularly, utilizes a meter and the meter-needle swing to provide some of the last-mentioned output indications in a manner to be described in greater detail below.

A reset network 34 is connected to the indicator apparatus 10 for positioning the various components and assemblies to receive and provide output indications of subsequently induced input signals, in a manner to be described in greater detail below.

In one preferred embodiment, as shown in FIG. 1, the amplifier network 24 is biased via a bias control 36 in an activated position of the bias control 36, the bias control 36 being connected to the amplifier network 24 via the active filter network 22. The bias control 36 is connected to the control signal generator 28 and receives the control signal therefrom, the amplifier network 24 being deactivated in response to the received control signal.

As schematically shown in FIG. 1, the delay and sample network 26, more particularly, includes a peak detector 38, a trigger signal generator 40 and a hold network 42. The output indicator 30, more particularly, includes the sample indicator 32, a meter network 44 and a reference network 46.

The peak detector 38 is connected to the trigger signal generator 40, a portion of the peak detector 38 developing the sample signal and providing a signal connected to the trigger signal generator 40 for generating the trigger signal in response to the development of the sample signal. More particularly, the peak detector 38 is constructed to delay the developing of the sample signal until the integral of the input signal shifts from an initial predetermined level to a second, predetermined level or, in other words, until the integral of the input signal reaches a predetermined minimum level thereby substantially preventing the premature sampling of the input signal induced via the transducer 12. The predetermined level of the integrated input signal initiating the trigger signal and the control signal is, in a preferred form, of a magnitude and delayed a period of time sufficient to prevent the sampling of the sample signal until the sensor 14 has been struck by the moving object and moved thereby a predetermined distance to substantially assure an optimum relationship between the moving object and the sensor 14 for substantially assuring the sample signal developed in response to the input signal induced in the indicator apparatus 10 via the transducer 12 is indicative of the velocity of the moving object, in a manner and for reasons to be described in greater detail below.

The voltage proportional to or indicative of the velocity of the moving object or, in other words, the sample signal developed in the peak detector 38 is connected to the meter network 44, the meter network 44 receiving the sample signal and providing the operator-perceivable output indication indicative of and responsive to the velocity of the moving object. The meter network 44 is connected to the reference network 46, and the reference network 46 is connected to the control signal generator 28 for receiving the control signal therefrom. The reference network 46 is constructed to develop a predetermined voltage reference signal (sometimes referred to herein simply as a "reference signal") in response to the received control signal, the reference signal being connected to the meter network 44 for reasons and in a manner to be made more apparent below.

The hold network 42 is connected to the peak detector 38 and connected to the control signal generator 28 via the reference network 46, the hold network 42 receiving the reference signal from the reference network 46 generated or produced in response to a received control signal and being activated in response thereto. The hold network 42 essentially prevents further sampling of subsequently induced input signals until the various components and assemblies are reset via the reset network 34.

In summary, the indicator apparatus 10 develops a sample signal proportional to the input signal and indicative of the velocity of a moving object in response to a received, input signal induced therein via the transducer 12 when the integral of the input signal reaches a predetermined minimum level substantially assuring a predetermined relationship between the transducer 12 and the moving object, the meter network 44 receiving the developed sample signal from a portion of the peak detector 38 and providing an operator-perceivable output indication indicative of the velocity of the moving object in response to the received sample signal. For the purpose of clarity of description, the various components and assemblies of the indicator apparatus 10, generally described above, and the operation thereof to provide the operator-perceivable output indication indicative of the velocity of the moving object will be described in greater detail below, particularly with respect to the indicator apparatus 10 constructed to sense the velocity of a golf club head and provide an output indication indicative of the velocity of the moving golf club head, as shown in FIGS. 1, 2 and 3, it being understood that the apparatus of the present invention is not to be limited to this particular operational embodiment.

As shown more clearly in FIGS. 2 and 3, the various components and assemblies of the indicator apparatus 10 are supported within a housing 48, a portion of the transducer 12 being, more particularly, supported by and removably secured to the housing 48. The transducer 12 includes a pair of plug type connectors 50, one connector 50 being secured to each side of a support 52 and the end of each connector 50, opposite the end thereof secured to the support 52, being removably secured within a connector receiving opening 54 formed in the housing 48. The connector receiving openings 54 receive each of the connectors 50 and cooperate therewith to establish electrical communication between the transducer 12 and the control circuit of the indicator apparatus 10, schematically shown in FIG. 1.

In a preferred form, each of the opposite sides 56 of the support 52 are electrically conductive for establishing electrical communication between the portion of the transducer 12 connected thereto and supported thereby and the control circuit of the indicator apparatus 10 via the connectors 50, such electrical conductivity being effected by coating the opposite sides 56 with an electrically conductive coating or securing an electrically conductive material to each of the opposite sides 56, for example. The support 52 also includes an electrically insulative material interposed between the electrically conductive portions of the opposite sides 56.

The support 52 extends from the housing 48 and securedly supports a first pair of connectors 58 and a second pair of connectors 60 spaced a distance from the housing 48, the second pair of connectors 60 being spaced a distance vertically from the first pair of connectors 58, as shown more clearly in FIG. 2. One end of each connector of the first and the second pair of connectors 58 and 60 is secured to one of the opposite sides 56 of the support 52, and the end portions of each connector, opposite the end portions secured to the support 52, are each constructed to removably receive one of the connector portions 62 secured on each end of a loop connector support 64, the opposite sides of the loop connector support 64 being constructed of an electrically conductive material in a manner similar to that described before with respect to the support 52.

The transducer 12 includes a magnet 66, schematically shown in FIG. 1, positiond and supported in the housing 48 such that the magnetic field produced thereby extends from the housing 48, the magnetic field vectors of the produced magnetic field being diagrammatically designated in FIGS. 2 and 3 by the reference numeral 70 for the purpose of orientation and clarity of description. The transducer 12 also includes a wire-like loop 72 constructed of an electrically conductive, non-magnetic material, such as copper, or aluminum, for example, the loop 72 comprising opposite ends, a passive section 74 and an active section 76.

One of the ends of the loop 72 is secured to one side of the loop connector support 64, and the other end of the loop 72 is secured to the opposite side of the loop connector support 64. Thus, each end of the loop 72 is connected to the control circuit of the indicator apparatus 10 via one of the conductive sides of the loop connector support 64, one of the opposite sides 56 of the support 52 and one of the plug type connectors 50, the two conductive paths being electrically insulated in a manner generally described before.

In one preferred form, as shown in FIGS. 2 and 3, the loop 72 and the loop connector support 64 are removably secured to the support 52 via the cooperating connector portions 62 and one of the first and the second pairs of connectors 58 and 60, and the support 52 is removably secured to the housing 48 via the plug type connectors 50 and the connector receiving openings 54 so that the loop 72 and the support 52 can be easily and conveniently secured in an assembled position on the housing 48 and removed or disassembled therefrom for storage or transportation. The first and the second pairs of connectors 58 and 60 are, more particularly, oriented with respect to the connector portions 62 such that the loop 72 and the loop connector support 64 can be removably secured to the housing 48 for engaging a moving object moving in opposite directions, for reasons and in a manner which will be made more apparent below.

The loop 72 and the support 52 are each constructed and shaped such that the support 52 securedly supports and positions the loop 72 in a predetermined horizontal and vertical plane wherein the passive section 74 extends generally parallel to the magnetic field produced via the magnet 66 or, in other words, generally parallel to the magnetic field vectors represented by the vector 70 in FIGS. 2 and 3, and the active section 76 extends generally perpendicular to the magnetic field produced via the magnet 66 and to the magnetic field vectors represented by the vector 70 in FIGS. 2 and 3. The two conductors forming the passive section 74 of the loop 72 each extend outwardly from the loop connector support 64 and each is tapered along the entire length thereof such that the distance therebetween generally increases from the loop connector support 64 toward the active section 76 thereof.

In one form, as shown in FIGS. 2 and 3, the active section 76 of loop 72 is formed by a wire-like conductor having a relatively smaller diameter as compared to a larger diameter portion of a portion of the passive section 74. The active section 76 is, more particularly, connected to the end of the passive section 74, generally opposite the end thereof connected to the loop connector support 64, and the end 78 of the loop 72 formed by the active section 76 is disposed in a generally vertically oriented plane, generally transverse to the orientation of the passive section 74 and transverse to the magnetic field vectors produced via the magnet 66, during the operation of the indicator apparatus 10 in a manner and for reasons to be made more apparent below.

As shown more clearly in FIG. 3, the end 78 of the loop 72 is also angularly formed and shaped to extend a distance 80 in a direction generally toward the moving object (fragmentarily and diagrammatically shown in FIG. 3 as a golf club head and designated therein via the reference numeral 82) or, in other words, in a direction generally opposed to the direction of movement of the moving object such that the active section 72 forming the end 78 of the loop 72 is initially engaged or struck by the moving object and moved thereby in a general direction 84. During the operation of the indicator apparatus 10, the housing 48 is adjustably positioned on the supporting earth surface, designated in FIG. 2 by the general reference numeral 85, via a flexible, cloth-covered bag 87 preferably filled with a plurality of pellet-like material, thereby providing a support for positioning the housing 48 and the loop 72 in predetermined positions on an irregular supporting earth surface 85, as generally indicated in FIG. 2. The active section 76 of loop 72 is then struck via the moving object 84, the moving object 84 moving the active section 76 in a general direction 84. As the active section 76 is moved in the direction 84, the active section 76 cuts across the magnetic field produced via the magnet 66.

When the active section 76 in initially engaged via the moving object, the movement of the active section 76 through the magnetic field does not correspond to the velocity of the moving object within an acceptable, reliable degree of accuracy; but, rather, the engagement between the active section 76 and the moving object must be maintained through a predetermined distance of travel to allow the active section 76 to substantially conform to the shape of the moving object (the golf club head 82), thereby substantially assuring the velocity of the active section 76 through the magnetic field produced via the magnet 66 substantially corresponds to the velocity of the moving object, the peak detector 38 delaying the developing of the sample signal to substantially assure the movement of the active section 76 through the predetermined distance of travel before initiating the sampling of the developed sample signal, in a manner generally described before and to be made more apparent below.

Thus, the transducer 12 is connected to the housing 48 and is constructed and supported in an assembled position wherein the passive section 74 extends in a plane generally parallel with the magnetic field vectors 70 of the magnetic field produced by the magnet 66 and the active section 76 extends in a plane generally transverse to the magnetic field vectors 70 of the magnetic field produced via the magnet 66 and in a plane generally transverse to the direction of travel of the moving object. The active section 76 is struck and moved by the moving object through a predetermined distance inducing an electromotive force (EMF) in the loop 72 proportional to and indicative of the velocity of the active section 76 moving through the magnetic field and thus proportional to the velocity of the moving object. The induced EMF in the loop 72 produces the input signal to the indicator apparatus 10. The peak detector 38 receives and integrates the induced input signal, the sampling of the input signal being delayed until the active section 76 has been moved through the predetermined distance, the predetermined distance being approximately one-tenth of an inch, in one operative embodiment, for example.

The sizing, construction and shape of the loop 72 substantially maximizes the signal induced in the loop 72 via the active section 76 cutting across the magnetic field, yet substantially minimizes the introduction of undesirable signals via the passive section 74. The outwardly increasing taper of the conductors comprising the passive section 74 substantially reduces the impact between the moving object and the passive section 74 and substantially reduces the amount of motion transmitted through the passive section 74 prior to the sampling of the input signal or, more particularly, the sample signal developed via the peak detector 38, thereby further minimizing the introduction of undesirable signals. The smaller diameter of the active section 76 facilitates the movement of the active section 76 relative to the passive section 74 in a manner minimizing the movement of the passive section 74 to still further substantially reduce the opportunity of undesirable signals being induced in the indicator apparatus 10.

It should be noted that, in one form, the magnet 66 of the transducer 12 is of the type generally referred to as a permanent type of magnet, yet other types of magnets can also be utilized in the indicator apparatus 10, and, in one other form, the magnet 66 can also be utilized to operate the meter needle movement of the meter network 44. The last-mentioned embodiment may be desirable in some applications since the additional cost of providing two separate magnetic sources is eliminated via the single magnet functioning in a dual capacity, as shown in FIG. 4, for example.

Referring more particularly to the control circuit of the indicator apparatus 10, shown in FIG. 1 and generally described before, the wire loop 72 is schematically represented as an electrical short connected across the input terminals 86 and 88 of the low pass filter network 20, the construction of the wire loop 72 and the control circuit connecting the induced input signal to the control circuit such that the polarity of the induced input signal voltage is positive at the terminal 88 and negative at the terminal 86. The low pass filter network 20 includes a pair of resistors 90 and 92, the resistor 90 being connected to the input junction 86 and the resistor 92 being connected to the input junction 88. The resistor 90 is also connected to an output junction 94 and the resistor 92 is also connected to an output junction 96. The low pass filter network 20 also includes four capacitors 98 each capacitor 98 being connected to one of the junctions 86, 88, 94 and 96, the sides of the capacitors 98, opposite the sides connected to the junctions, being connected to a common ground. In one operational embodiment, the low pass filter network 20 and the various components thereof are constructed and sized to attenuate input signals thereto having a frequency exceeding approximately $10^4$Hz, the low pass filter netwok 20 passing input signals thereto having frequencies generally below approximately $10^4$Hz.

The output of the low pass filter network 20 at the output junctions 94 and 96 is connected to the junctions 100 and 102 of the active filter network 22. The active filter network 22 includes four impedance devices or, more particularly, four resistors 104, 106, 108 and 110 connected in a bridge network type of arrangement wherein the resistors 104 and 108 are each connected to the junctions 100, the resistors 106 and 110 are each connected to the junction 102, the resistors 104 and 106 are each connected to a junction 112, and the resistors 108 and 110 are each connected to a junction 114. The resistors 104 and 106 have substantially the same resistance value and the resistors 108 and 110 have substantially the same resistance value. The junctions 100 and 102 provide the common input junctions and output junctions of the active filter network 22 (the junctions being sometimes referred to below as the "input-output junctions 100 and 102"), the junction 112 being connected to the negative or inverting input of an operational amplifier 116, and the junction 114 being connected to the output of the operational amplifier 116. The positive or noninverting input of the operational amplifier 116 is connected via a conductor 118 to the bias control 36, which is constructed to provide a constant operating bias for the differential amplifier network comprising a portion of the amplifier network 24, in a manner to be described in greater detail below.

The active filter network 22 operates to maintain the sum of the voltage levels at the junctions 100 and 102 substantially constant or, in other words, to substantially maintain the sum of the voltages at a predetermined level controlled via the bias voltage input to the noninverting input of the operational amplifier 116 from the bias control 36, thereby effectively cancelling or providing a relatively low impedance to common mode signals. The active filter network 22 provides a relatively high input impedance with respect to differential input signals connected to the input-output junctions 100 and 102, thereby essentially providing an open circuit with respect to input differential signals. The operational amplifier 116 operates to substantially maintain the inverting input at substantially the same voltage level as the noninverting input, the output of the operational amplifier 116 tending to maintain the common mode voltage at the input-output terminals 100 and 102 relatively constant.

Referring more particularly to the bias control 36, a negative power supply is connected to a terminal 124, the terminal 124 being connected to a silicon type of diode 126 and to the emitter of a germanium type transistor amplifier 122 via a resistor 128, the collector of the transistor amplifier 122 being connected to the control signal generator 28 via a conductor 130 and to the base of the transistor amplifier 120. A zener type of diode 132 is interposed in the conductor 130, generally between the connection between the collector of the transistor amplifier 122 and the base of the transistor amplifier 120 and the conductor 130. Thus, when a positive control signal is generated via the control signal generator 28, that positive control signal is applied to the base of the transistor amplifier 120 via the diode 132 which reduces the base-emitter voltage of the transistor amplifier 120 to substantially zero thereby switching the transistor amplifier 120 "off" or non-conducting. In this position of the transistor amplifier 120, the voltage on the conductor 118 is substantially zero thereby connecting a substantially zero common mode or bias voltage to the amplifier network 24 deactivating the amplifier network 24.

The emitter of the transistor amplifier 120 is connected to ground via a resistor 134 and a variable resistor 136, a pair of diodes 138 are connected between the resistor 134 and the variable resistor 136 and to the base of the transistor amplifier 120, generally between the transistor amplifier 120 and the connection of the base thereof to the collector of the transistor amplifier 122, as shown in FIG. 1. Thus, within defined limits, the variable resistor 136 adjustingly controls the level of the output voltage of the bias control 36 at the conductor 118, thereby controlling the voltage supplied to the operational amplifier 116 of the active filter network 22 and providing an adjustable bias voltage or signal control for the amplifier network 24 via the bias control 36.

The output of the active filter network 22 at the input-output junctions 100 and 102 is connected to the amplifier network 24 via a pair of conductors 140 and 142. More particularly, the conductor 140 is connected to the emitter of a transistor amplifier 144 and the conductor 142 is connected to the emitter of a transistor amplifier 146, the base of each of the transistor amplifiers 144 and 146 being connected to ground. The collector of each of the transistor amplifiers 144 and 146 is connected to a positive power supply at the terminal 148, the collector of the transistor amplifier 144 being connected at the terminal 148 via a resistor 150 and the collector of the transistor amplifier 146 being connected to the terminal 148 via a resistor 152

The two transistor amplifiers 144 and 146 are thus connected to receive and amplify the active filter network 22 output signal and generally comprise an emitter coupled common base type of amplifier network, the bias control 36 being connected to the transistor amplifiers 144 and 146 providing the bias voltage therefor during the operation of the indicator apparatus 10 and in an activated position of the bias control 36. The signal amplified via the transistor amplifier 144 is connected to the positive input of an operational amplifier 154 via a conductor 156, connected generally between the collector of the transistor amplifier 144 and the resistor 150, and the signal amplified via the transistor amplifier 146 is connected to the negative input of the operational amplifier 154 via a conductor 158, connected between the collector of the transistor amplifier 146 and the resistor 152.

A resistor 160 is connected to ground and to the positive input of the operational amplifier 154 via the conductor 156, as shown in FIG. 1. The output signal of the operational amplifier 154 is connected to the peak detector 38 via a conductor 162, a feedback resistor 164 being connected between the operational amplifier 154 output signal on the conductor 162 and the negative input thereto. The transistor amplifiers 144 and 146 and the operational amplifier 154 are, more particularly, connected to comprise what may be referred to as an emitter coupled, common base differential type of amplifier network.

A capacitor 166 and a resistor 168 are interposed in the conductor 162, the capacitor 166 blocking the D-C component of the output signal of the operational amplifier 154. The conductor 162 is, more particularly, connected to a conductor 172 at a junction 174, the junction 174 being connected to the negative input of the operational amplifier 170. The positive input of the operational amplifier 170 is connected to ground, as shown in FIG. 1.

The output of the operational amplifier 170 in the peak detector 38 is connected to a junction 176, and an integrator capacitor 178 is connected between the operational amplifier 170 output signal at the junction 176 and the negative input to the operational amplifier 170 at the junction 174, the integrator capacitor 178 being connected to and cooperating with the operational amplifier 170 such that the operational amplifier 170 and the integrator capacitor 178 function in the nature of an integrating network during one portion of the operation of the indicator apparatus 10, as generally described before and in a manner to be described in greater detail below.

The peak detector 38 also includes a switch 180 connected to a positive power supply at a junction 182 and to the negative input of the operational amplifier 170 or, more particularly, to the junction 174, the switch 180 being more particularly of the type referred to in the art as a "MOS field-effect transistor switch" designed for enhancement-mode operation in relatively low power switching applications, for example. The integrator capacitor 178 is connected to the switch 180, generally between the switch 180 and the junction 174. The switch 180 is connected to a sample capacitor 184 at a junction 186, the side of the sample capacitor 184, opposite the side connected to the junction 186 being connected to ground. The junction 186 is connected to one side of the integrator capacitor 178 at a junction 188, generally between the integrator capacitor 178 and the output of the operational amplifier 170 or, in other words, generally between the integrator capacitor 178 and the junction 176. A diode 190 is interposed between the junction 186 and the junction 188, the cathode end of the diode being connected to the junction 186 thereby preventing the discharge of the sample capacitor 184 therethrough, for reasons which will be made more apparent below.

A sample resistor 192 is connected to the conductor 172 and to the negative input of the operational amplifier 170 at the junction 174, the sample resistor 192 also being connected to the output of the operational amplifier 170 at the junction 176 and a diode 194 being interposed between the resistor 192 and the junction 176. The sample resistor 192 is thus connected between the input and the output of the operational amplifier 170 at a pair of junctions 196 and 198, and is connected to the positive power supply 182 via the switch 180, as shown in FIG. 1. The junction 198 is connected to the meter network 44 via a conductor 200 and a resistor 202 is interposed in the conductor 200, generally between the junction 198 and the meter network 44. Thus, the meter network 44 is connected to the peak detector 38 to measure and provide an operator-perceivable output indication of the voltage drop across the sample resistor 192, the voltage drop across the sample resistor 192 being indicative of and proportional to the velocity of the moving object striking the active section 76 of the transducer 12, in a manner which will be made more apparent below.

During the operation of the indicator apparatus 10, the output signal from the operational amplifier 170 of the peak detector 38 at the junction 176 is initially at a first level which is "low", the output of the operational amplifier 170, in one operative embodiment, being a negative voltage value of −0.7 volts, for example. This initial low output signal of the operational amplifier 170 is primarily due to the continuous sampling of relatively low level "noise" during the resetting of the indicator apparatus 10, the sample capacitor 184 having some relatively low charge thereon. When the input signal is induced in the control circuit of the indicator apparatus 10 via the transducer 12 and amplifier via the amplifier network 24, the amplified input signal is connected to the operational amplifier 170 causing the operational amplifier 170 output signal at the junction 176 to swing in a positive direction, the operational amplifier 170 and the capacitor 178 connected in parallel with the input and the output of the operational amplifier 170 functioning as an integrating network to integrate the input signal received via the operational amplifier 170. The positive swing integrated input signal at the output junction 176 of the operational amplifier 170 charges the integrator capacitor 178 and, when the voltage level of the integrated input signal at the junction 176 reaches a predetermined minimum level, the diode 190 is forward biased and the sample capacitor 184 begins to charge. The integrator capacitor 178 is, more particularly, sized to have a predetermined charging time; that is, a predetermined period of time is required to charge the integrator capacitor 178, for reasons and in a manner to be described in greater detail below with respect to the operation of the indicator apparatus 10.

The peak detector 38 is, more particularly, connected to the trigger signal generator 40 via a conductor 200, having a capacitor 202 and a resistor 204 interposed therein, the conductor 200 being more particularly connected to the junction 188 and to the negative input of an operational amplifier 206. The positive input to the operational amplifier 206 is connected to ground, and the output signal of the operational amplifier 206 is connected to a junction 208 via a resistor 210. A feedback loop is connected between the output of the operational amplifier 206 and the negative input to the operational amplifier 206, the feedback loop comprising a feedback resistor 212 and a diode 214, a diode 214 being connected in parallel with the feedback resistor 212.

The junction 208, connected to the output of the operational amplifier 206, is connected to the junction 176 of the peak detector 38 via a diode 216, the common connection between the junction 176 and the diode 216 being connected to the collector of a transistor amplifier 218 in the hold network 42. The junction 208, generally between the diode 216 and the resistor 210, is also connected to the control signal generator 28 via a conductor 220, a diode 222 being interposed in the conductor 220.

The operational amplifier 206 is thus connected to th various components of the trigger signal generator 40 to operate and function in the nature of a logarithmic differentiator, the differentiator network receiving the integrated input signal from the peak detector 38 via the connection between the inverting input of the operational amplifier 206 and the junction 188 of the peak detector 38 and producing an output signal responsive to the negative value of the rate-of-change of the integrated input signal with respect to time. The diode 222 is sized to be forward biased conducting the trigger signal generator 40 output signal or, more particularly, the trigger signal to the control signal generator 28 at a predetermined "high" level of the differentiator output signal connected to the junction 208 and the diode 216 is sized to not clamp the differentiator output signal at the junction 208 at a predetermined high level of the integrated input signal at the junction 176. Thus, the diodes 216 and 222 and the resistor 210 comprise what may generally be referred to as a "logical AND circuit" constructed such that the signal at the junction 176 of the peak detector 38 and the signal at the junction 208 of the trigger signal generator 40 must each be at a predetermined high level before the trigger signal is generated and produced by the trigger signal generator 40 and connected to the control signal generator 28 via the diode 222. The produced and generated trigger signal of the trigger signal generator 40 is thus indicative of the development of the sample signal in the peak detector 38, in a manner and for reasons to be made more apparent below.

The control signal generator 28 basically comprises a pair of transistor amplifiers 224 and 226, schematically shown in FIG. 1. The trigger signal from the trigger signal generator 40 is connected to the base of the transistor amplifier 224 via the conductor 220 and the diode 222 in a forward biased position of the diode 222, the base of the transistor amplifier 224, generally between the diode 222 and the transistor amplifier 224, being connected to the collector of the transistor amplifier 226 via a resistor 228, and the base of the transistor amplifier 226 being connected to the collector of the transistor amplifier 224 via a resistor 230. The emitter of the transistor amplifier 224 is connected to ground, and the collector of the transistor amplifier 224 is connected to a positive power supply at a terminal 232 via a resistor 234, the resistor 234 being interposed between the connection between the base of the transistor amplifier 226 to the collector of the transistor amplifier 224 and the positive power supply connected at the terminal 232. The transistor amplifiers 224 and 226 are thus interconnected to comprise what is commonly referred to in the art as a "flip-flop" circuit wherein the transistor amplifier 226 is initially biased in the conducting or "on" position and the transistor amplifier 224 is initially biased in the nonconducting or off position, the status of the transistor amplifiers 224 and 226 being reversed in response to a received trigger signal from the trigger signal generator 40, the control signal generator 28 thus producing the control signal in response to a received, positive trigger signal, as mentioned before and for reasons which will be made more apparent below.

The peak detector 38 is connected to the reset network 34 and, more particularly, the junction 186 between the capacitor 184 and the switch 180 is connected to a switch 235, the switch 235 being, more particularly, a field effect type of transistor (FET) and the junction 186 being, more particularly, connected to the source connection of the switch 235 via a diode 236 and a resistor 238. The drain side of the switch 235 is connected to to ground, as shown in FIG. 1. The gate of the switch 235 is connected to a junction 240 via a resistor 242.

The reset network 34 includes a pair of electrical power supplies 244 and 246, the negative side of the power supply 244 being connected to the positive side of the power supply 246 and the common connection therebetween being connected to ground, as shown in FIG. 1. The power supply 244 is connected to a switch position 248 and the power supply 246 is connected to a switch position 250, the switch positions 248 and 250 constituting the reset and on switch positions of a double-pole, single throw switch 252 having a pair of mechanically connected switch arms 254, as shown in FIG. 1. The switch 252 also includes a pair of off switch positions, each designated by the reference numeral 255 in FIG. 1.

One of the switch arms 254 of the switch 252 is connected to the terminal 240 via a capacitor 256, the connection between the switch arm 254 and the capacitor 256 being connected to the positive buss for the indicator apparatus 10 at a terminal 258 and the other switch arm 254 of the switch 252 being connected to the terminal 240 via a resistor 260 and a diode 262 connected in parallel and to the negative buss for the indicator apparatus 10 at a terminal 263. In the off position of the switch 252, the switch arms 254 are each positioned to interrupt the electrical continuity between the electrical power supplies 244 and 246 and the components and assemblies of the indicator apparatus 10 connected thereto and, in the reset or on position of the switch arms 254, electrical continuity is established between the electrical power supplies 244 and 246 and the various components and assemblies of the indicator apparatus 10, in a manner to be described in greater detail below.

The source side of the switch 235 is connected to a germanium type of transistor amplifier 264 in the reference network 46 via a resistor 268, the source side of the switch 235 being more particularly connected to the emitter of the transistor amplifier 264. The emitter of the transistor amplifier 264 is connected to a positive power supply at a terminal 270 via a resistor 272, and a silicon diode 274 is connected between the resistor 272 and the positive power supply 270 and to the base of the transistor amplifier 264.

The base of the transistor amplifier 264, generally between the transistor amplifier 264 and the diode 274 is connected to the collector of a transistor amplifier 276.

The base of the transistor amplifier 276 is connected to the collector of the transistor amplifier 226 in the control signal generator 26 and the collector of the transistor amplifier 264 is connected to the collector of the transistor amplifier 226 in the control signal generator 28. The emitter of the transistor amplifier 276 in the reference network 46 is connected to a junction 277 via a conductor 280, the junction 277 being connected to ground and to the emitter of the transistor amplifier 226 of the control side generator 28. A resistor 278 is interposed in the conductor 280, and a zener type of diode 282 is connected between the base of the transistor amplifier 276 of the reference network 46 and the conductor 280, generally between the resistor 278 and the transistor amplifier 226 of the control signal network 28. The reference network 46 is constructed to receive a control signal from the control signal generator 28 via the connection between the transistor amplifier 226 of the control signal generator 28 and the transistor amplifiers 264 and 276 in the reference network 46, in one aspect of the operation of the indicator apparatus 10, the reference network 46 being constructed to develop a predetermined voltage reference signal in response to a received control signal which is connected to the meter network 44, for reasons and in a manner to be described in greater detail below.

The emitter of the transistor amplifier 276 in the reference network 46 is also connected to a junction 284 and the junction 284 is connected to the base of a transistor amplifier 286 via a resistor 288, the transistor amplifier 286 comprising a portion of the sample indicator 32, as shown in FIG. 1. The emitter of the transistor amplifier 286 is connected to ground, and the collector of the tranistor amplifier 286 is connected to a positive power supply at a junction 290, a resistor 292 being interposed between the collector of the transistor amplifier 286 and the junction 290. The collector of the transistor amplifier 286 is connected to the conductor 314 via a conductor 294, the conductor 294 being connected generally between the resistor 292 and the collector of the transistor amplifier 286. A zener type of diode 296 is interposed in the conductor 314, the anode end of the diode 296 being connected to ground and the cathode end of the diode 296 being connected to the junction or connection between the conductor 294 and the conductor 314. The sample indicator 32 cooperates with the meter network 44 to provide an operator-perceivable output indication indicating that the sample voltage has been developed in the peak detector 38, in a manner to be made more apparent below.

The hold network 42 includes the transistor amplifier 218, as mentioned before, and the base of the transistor amplifier 218 is connected to the junction 284 via a conductor 298, and a resistor 300 is interposed in the conductor 298 generally between the transistor amplifier 218 and the junction 284. The collector of the transistor amplifier 218 of the hold network 42 is connected to the junction 176 of the peak detector 38 via a conductor 302, generally between the junction 176 and the diode 216 of the trigger signal generator 40. The emitter of the transistor amplifier 218 in the hold network 42 is connected to the junction 174 and 196 of the peak detector 38 via a conductor 304, a diode 306 being interposed in the conductor 304, generally between the transistor amplifier 218 of the hold network 42 and the junction 196 of the peak detector 38.

A diode 305 is connected to the emitter of the transistor amplifier 218, generally between the transistor amplifier 218 and the diode 306, the diode 305 connecting the junction 176 of the peak detector 38 to ground in an on or conducting position of the transistor amplifier 218 to swing the output signal of the operational amplifier 170 in the negative-going direction lowering the voltage level at the junction 176, reverse-biasing the diode 190, thereby preventing further charging of the sample capacitor 184 and cooperatingly preventing the further sampling of subsequent input signals via the peak detector 38 until the indicator apparatus 10 has been reset. The transistor amplifier 218 also functions to drive the junction 174 of the peak detector 38 positive in the conducting or on position of the transistor amplifier 218 which further swings the operational amplifier 170 output signal at the junction 176 in the negative direction The meter network 44 includes an operational amplifier 308 having the output thereof connected to a meter 310, the meter 310 being more particularly constructed and connected to the components of the meter network 44 to comprise what is commonly referred to in the art as a "null type meter", as generally mentioned before. The meter 310 is also connected to ground via a resistor 312, as shown in FIG. 1.

The positive input of the operational amplifier 308 is connected to the collector of the transistor amplifier 286 via a conductor 314, the conductor 314 being, more particularly, connected at the junction or connection between the conductor 294 and the cathode end of the diode 296. A capacitor 316 is interposed in the conductor 314 and a resistor 318 is connected to one side of the capacitor 316, the resistor 318 being then connected to ground. A pair of diodes 320 and 322 connected in parallel are interposed between the capacitor 316 and the operational amplifier 308, as shown in FIG. 1. A resistor 324 is connected to the positive input of the operational amplifier 308, generally between the operational amplifier 308 and the diodes 320 and 322, the resistor 324 being connected to ground.

The negative input of the operational amplifier 308 is connected to the junction 384 via a conductor 326 and a variable resistor 328 is interposed in the conductor 326, generally between the operational amplifier 308 and the junction 284. A feedback resistor 330 is connected between the negative input of the operational amplifier 308 and the output thereof, the conductor 200, connecting the junction 198 of the peak detector 38 to the meter network 44, being more particularly connected between the feedback resistor 330 and the negative input of the operational amplifier 308. The cathode end of a diode 332 is connected to the junction between the feedback resistor 330 and the conductor 200, the anode end of the diode 332 being connected to ground.

As mentioned before, the meter 310 is, more particularly, a null type of meter and includes a meter needle 334, as shown in FIG. 3, in one preferred form. The meter 310 receives the operational amplifier 308 output signal and the meter needle 334 moving in the direction 336 or in the opposite direction provides one form of operator-perceivable output indication. The nulling of the meter 310 to position the meter needle 334 at a substantially zero or null position, as shown in FIG. 3, by varying the adjustable resistor 328 to balance the sample signal and the voltage reference signal to a position wherein the operational amplifier 308 output signal nulls the meter needle 334 provides the operator-perceivable output indication indicative of the velocity of the moving object, the variable resistor 328 being calibrated in terms of velocity to provide the output indication, in the operational embodiment of the present invention shown in FIGS. 1, 2, and 3.

OPERATION OF FIGS. 1, 2 and 3

The indicator apparatus 10, shown in FIGS. 1, 2 and 3 and described in detail before, is constructed to sense the velocity of a moving object and provide an operator-perceivable output indication indicative thereof. In one preferred operational embodiment, the indicator apparatus 10 is, more particularly, constructed to sense the velocity of a club head 82 moving in a general direction 84, as shown in FIG. 3, and striking the active section 76 of the transducer 12, the indicator apparatus 10 providing the operator-perceivable feedback indication indicative of the velocity of the club head 82 via the setting of the variable resistor 328 to null the meter 310 in a manner described before. For the purpose of clarity of description, the current through the integrator capacitor 178 is diagrammatically shown in FIG. 1 and designated by the reference numeral 338, the current through the switch 180 is diagrammatically shown in FIG. 1 and designated by the reference numeral 340, and a current being drawn generally from the junction 174 is diagrammatically shown in FIG. 1 and designated by the reference numeral 342, the currents 338, 340 and 342 being referred to below with reference to the operation of indicator apparatus 10.

When the indicator apparatus 10 is initially positioned in the off position via moving the switch arms 254 to the off switch positions 255, the capacitor 256 connected to and discharged through the positive buss at the terminal 258, the various components and assemblies of the indicator apparatus 10, through the negative buss at the terminal 263, through the diode 262 and resistor 260 to the junction 240. Except for the voltages of the power supply of the indicator apparatus 10 provided via the power supplies 244 and 246, the voltage levels within the control circuit of the indicator apparatus 10 will drop to zero within a relatively short time after the switch 252 is positioned in the off position. But for the diode 262, the operator would be required to maintain the switch 252 in the off position for a period of time controlled essentially via the time-constant of the capacitor 256 and the resistor 260 before again positioning the switch 252 in the on position during the reset operation of the indicator apparatus 10, as will be made more apparent below.

When the switch 252 is initially positioned in the on or "reset" position via moving the switch arms 254 to the switch positions 248 and 250, the capacitor 256 of the reset network 34 is charged via the resistor 242 and the field-effect transistor or switch 235, the capacitor 256 also being charged via the resistor 260. The capacitor 184 is discharged via the switch 235 to the ground connection at the drain side of the switch 235. The positive power supply at the terminal 270 is connected to ground via the switch 235 causing an increased current flow across the resistor 272 biasing the transistor amplifier 264 of the reference network 46 in the off or non-conducting position, the transistor 276 being biased in the off or non-conducting position and the reference voltage at the junction 284 being substantially zero. The transistor amplifier 224 of the control signal generator 28 is biased in the off or non-conducting position and the transistor amplifier 226 of the control signal generator 28 is biased in the on or conducting position connecting a relatively small positive voltage to the diode 132 of the bias control 36 via the conductor 130, the positive voltage connected to the diode 132 being of an insufficient voltage level to bias the diode 132 in the conducting or closed position, in this position of the indicator apparatus 10.

After the switch 252 is positioned in the on or reset position, the control circuit of the indicator apparatus 10, shown in FIG. 1, is positioned in the operating position for receiving input signals induced therein via the transducer 12. In this position of the indicator apparatus 10, the capacitor 256 is fully charged and a negative voltage is applied to the gate of the switch 235 opening or positioning the switch 235 in an off position, the diode 236 between the switch 235 and the junction 186 of the peak detector 38 being reversed biased and positioned in the open position. The transistor amplifiers 120 and 122 of the bias control 36 are each biased in the on or conducting position connecting the operation bias voltage to the transistor amplifiers 144 and 146 of the amplifier network 24 via the active filter network 22, the output voltage level of the bias control 36 controlling and setting the common mode voltage level biasing the transistor amplifiers 144 and 146 in the on or conducting position.

Further, after the indicator apparatus 10 is positioned in the on or reset position, the junction 208 is clamped to substantially ground potential via the diode 216 and a relatively small noise current 340 is conducted through the switch 180 of the peak detector 38 holding the output of the operational amplifier 170 at the junction 176 at the initial or first level, which is approximately a negative 0.7 volts in the one operational embodiment, mentioned generally before. The base of the transistor amplifier 218 of the hold network 42 is clamped to substantially ground potential via the negative voltage at the junction 176 of the peak detector 38, the diodes 305 and 306 each being biased in the open or non-conducting position.

In summary, the indicator apparatus 10 is positioned in the reset or on position via positioning the switch arms 254 in the switch position 248 and 250, thereby discharging the capacitor 184 and positioning the control circuit such that: the amplifier network 24 is biased in the operation position by the bias control 36 connected thereto via the active filter network 22; the diode 236 is reverse biased or open; the control signal generator 28 is held in the reset or on position wherein the transistor amplifier 224 is biased in the off or non-conducting position and the transistor amplifier 226 is biased in the on or conducting position; the peak detector 38 having sampled during the transient period of reset relatively low level noise signals in the input circuit of the indicator apparatus 10 by charging the capacitor 184, the current 340 representing or indicating the sampled noise current; the sampled noise current causes a voltage drop at the diode 194 establishing the initial, first level of voltage at the junction 176; and the capacitor 156 of the reset network 34 is fully charged and the switch 135 is positioned in the open position. In this position, the indicator apparatus 10 is positioned to receive, sample and display induced input signals.

Referring more particularly to the operational embodiment of the indicator apparatus 10 for providing operator-perceivable output indications indicative of the velocity of a moving object, referred to before, when the moving object or, more particularly, the golf club head 82 in one embodiment, is moved in a direction 84 striking and contactingly engaging the active section 76 of the transducer 12, the moving object will move the active section 76 in a general direction 84 following the movement of the moving object. The moving object will, more particularly, strikingly engage and move the active section 76 in a general direction 84 aligned with the direction of movement of the moving object, the active section 76 being moved a distance through the magnetic field produced via the magnet 66, thereby inducing the input signal in the control circuit of the indicator apparatus 10. As mentioned before, the indicator apparatus 10, in a preferred form, is constructed to sample the input signal received via the transducer 12 after the active section 76 has been moved by the moving object through a predetermined distance substantially assuring that the active section 76 has conformed to the shape of the moving object and is thus moving through the magnetic field at a velocity substantially conforming to the velocity of the moving object, thereby substantially assuring that the sample signal developed via the delay and sample network 26 is proportional to or indicative of the velocity of the moving object. It is of course understood that the moving object 82 will continue to engage and move the transducer 12 for an additional period of time as the moving object is moved in the direction 84; however, the indicator apparatus 10 is constructed to substantially prevent or block further sampling of induced input signals after the sample signal has been developed in the delay and sample network 26 and prior to resetting the indicator apparatus 10.

As the active section 78 of the transducer 12 is moved by the moving object to cut across the lines of flux produced via the magnet 66, an electromotive force (EMF) is induced in the transducer 12, thereby producing the input signal, induced EMF being indicative of the velocity of the active section 76 moving through the magnetic field. The induced input signal from the transducer 12 is connected to the control circuit of the indicator apparatus 10 at the input junctions 86 and 88, the input signal being connected to the amplifier network 24 via the low pass filter network 20 and the active filter network 22, as described before. The input signal is amplified via the amplifier network 24 and connected to the peak detector 38 via the conductor 162.

The amplifier network 24 output signal is, more particularly, connected to the junction 174 of the peak detector 38 and to the negative input of the operational amplifier 170 of the peak detector 38. The operational amplifier 170 inverts the amplifier network 24 output signal, thereby swinging the output of the operational amplifier 170 at the junction 176 in a positive-going direcion, the operational amplifier 170 and the integrator capacitor 178 integrating the operational amplifier 154 output signal.

As previously mentioned, the peak detector 38 receives and integrates some relatively low amplitude noise signals prior to sampling and the noise signals appear at the junction 176 of the delay and sample network 26 establishing the first, initial predetermined voltage level of the delay and sample network 26, the initial predetermined voltage level being of an insufficient value to activate trigger signal generator 40. The amplified, induced input signal of the indicator apparatus 10 is integrated via the delay and sample network 26 and the integrated input signal appears at the junction 176 of peak detector 38 raising the voltage level generally from the initial predetermined level toward the second predetermined level sufficient to activate the trigger signal generator 40, as will be described in greater detail below.

Thus, when the indicator apparatus 10 initially starts receiving the induced input signals, the input signal and the noise signal are each integrated via the peak detector 38 and the integrated signal appears at the junction 176, the integration of the signals being generally expressed algebraically as follows for the purpose of clarity of description:

$$\int (I_{342} - I_{340}) dt \tag{1}$$

wherein:

$I_{340}$ = represents the value of current through the switch 180, the current being more particularly produced by the noise signal, in this instance;

$I_{342}$ = represents the value of the current drawn generally from the junction 174 as a result of the induced input signal.

In this position of the indicator apparatus 10 initially receiving an induced input signal, the voltage across the sample resistor 192 (between the junctions 196 and 198) is substantially zero, the capacitor 178 of the peak detector 38 is being charged via the current 338 and the capacitor 202 connected to the negative input of the operational amplifier 206 is being charged. If the input signal is not of a sufficient strength for a predetermined duration to shift the integrated input signal at the junction 176 to the predetermined minimum value, the indicator apparatus 10 will not be positioned in a sampled position, the diode 222 connected to the control signal generator 28 remaining in a reversed bias position.

Assuming the induced input signal is of a sufficient strength to raise or shift the voltage level at the junction 176 from the initial predetermined level to the predetermined minimum level to cause the indicator apparatus 10 to be positioned in the sampled position, the induced input signal amplified via the amplifier network 24 is integrated via the peak detector 38, the integrated input signal appearing at the junction 176 in a manner similar to that described before. The output signal of the operational amplifier 170 thus swings in the positive-going direction and the capacitors 178 and 202 each begin charging. As the voltage level at the junction 176 continues to rise, the capacitor 178 continues to charge and the sample capacitor 184 will begin to charge (in most instances) when the voltage level at the junction 176 is of a sufficient level to forward bias the diode 190, the charging of the sample capacitor 184 biasing the switch 180 in the closed or conducting position increasing the current 340. Also, as the integrated input signal continues to swing the voltage level at the junction 176 in the positive-going direction, the current through the switch 180 will continue to increase as the charge on the sample capacitor 184 is increased, and the current through the integrator capacitor 178 will generally decrease as the voltage level at the junction 178 approaches the predetermined minimum level for positioning the indicator apparatus 10 in the sampled position.

The peak detector 38 is constructed such that, when the current represented by the directional arrow 340 is substantially equal to the current being drawn from the peak detector 38 represented by the directional arrow 342, the slope of the integrated input signal at the junction 176 is substantially zero since the current 338 is equal to the capacitance of the integrator capacitor 178 multiplied by the rate-of-change of the voltage level at the junction 176 with respect to time and, if the rate-of-change of the voltage level at the junction 176 is substantially equal to zero, then the current 338 is substantially equal to zero. In this position of the delay and sample network 26, the voltage level at the junction 176 is at the predetermined minimum voltage level (the second predetermined level) sufficient to cause the generation of the trigger signal and the control signal for positioning the indicator apparatus 10 in the sampled position.

The trigger signal generator 40 receives the signal at the junction 176 or, more particularly, at the junction 188, and is constructed to switch output state thereof when the slope of the signal at the junctions 176 and 188 is substantially zero or, in other words, when the peak detector 38 voltage level of the output signal at the junctions 176 and 178 has switched from the first, initial predetermined level to the second, predetermined minimum level. In response to the received output signal from the peak detector 38 of the predetermined minimum level, the output signal of the operational amplifier 206 at the junction 208 switches to the high state or, in other words, the trigger signal generator 40 generates and produces the output trigger signal. The trigger signal is connected to the base of the transistor amplifier 224 and to the collector of the transistor amplifier 226 via the resistor 228, thereby biasing the control signal generator 28 to a position wherein the transistor amplifier 224 is biasingly switched to the on or conducting position and the transistor amplifier 226 is in the off or non-conducting position, the control signal generator 28 remaining in this position until the indicator apparatus 10 is reset via the reset network 34 in a manner described before.

Immediately prior to the generation of the trigger signal via the trigger signal generator 40, the transistor amplifier 276 is biased in the off or non-conducting position and the voltage level at the junction 284 of the reference network 46 is substantially zero, the transistor amplifier 218 of the hold network 42 being biased in the off or non-conducting position. After the trigger signal has been generated via the trigger signal generator 40, the transistor amplifiers 264 and 276 are each biased in the on or conducting position thereby developing and producing a predetermined reference voltage level at the junction 284 of the reference network 46. The reference voltage at the junction 284 is connected to the base of the transistor amplifier 218 of the hold network 42 biasing the transistor amplifier 218 in the on or conducting state.

The transistor amplifier 286 of the sample network 32 is biased in the on or conducting position, discharging the capacitor 316, previously charged via the connection thereof to the positive power supply at the terminal 290. The discharging of the capacitor 316 causes a signal input at the positive or noninverting input of the operational amplifier 308 thereby causing the meter needle 334 to be moved indicating that the sample signal has been developed in the peak detector 38, the capacitor 316 being subsequently recharged.

When the trigger signal is generated via the trigger signal generator 40 and the control signal is generated via the control signal generator 28, the transistor amplifier 218 of the hold network 42 is thus biased in the on or conducting position connecting the operational amplifier 170 output signal at the junction 176 to ground via the diode 305 and conducting a positive signal to the input of the operational amplifier 170 at the junction 174 causing the output signal of the operational amplifier 170 at the junction 176 to further swing in the negative-going direction. Since the negative-going swing at the junction 176 occurs immediately after the slope of the signal at the junction 176 goes to substantially zero, the sample capacitor 184 is thus substantially blocked from further charging, the diode 190 being reverse biased or open. The negative-going swing at the junction 176 is continued until the current through the resistor 300 goes through the collector of the transistor amplifier 218 in the nature of a forward biased diode, the current through the diodes 305 and 306 of the hold network 42 going to substantially zero. The amplifier network 24 is biased in the off position via the bias control 36 and the current 342 goes to substantially zero, the current 338 being substantially zero during this stage of the operation of the indicator apparatus 10, after a transient period of time. Thus, the current 340 will go through the sample resistor 192 developing a voltage drop thereacross equal to the developed sample signal. In this position of the indicator apparatus 10 should the voltage level at the junction 176 tend to move in the positive-going direction charging the sample capacitor 184, the hold network 42 acts to draw current from the junction 176 and conduct the positive hold or blocking signal to the junction 174 at the negative or inverting input of the operational amplifier 170, thereby lowering the voltage level at the junction 176 and effectively clamping the junction 176 at a voltage level sufficiently low to substantially prevent further charging of the sample capacitor 184. The transistor amplifier 218 thus provides a clamping action blocking the receiving and sampling of subsequently induced input signals via the peak detector 38. Thus, after the transient period of time, the current 338 through the integrator capacitor 178 is substantially zero and the sample capacitor 184 remains charged continuing to bias the switch 180 closed to produce the current 340 for developing the sample signal across the sample resistor 192.

The sample signal across the resistor 192 is connected to the meter network 44 and the adjusting of the variable resistor 328 to null the meter 310 provides the output indication indicative of the velocity of the moving object. The indicator apparatus 10 provides an operator-perceivable output indication via the meter 310 indicating that the trigger signal and the control signal have been generated to initiate the positioning of the indicator apparatus 10 in the sampled position via the discharging of the capacitor 316 to cause the meter needle 334 to swing to the left of the null position.

After the meter network 44 has been adjusted to provide the output indication indicative of the velocity of the moving object, the operator can re-position or reset the indicator apparatus 10 for receiving and sampling additional, subsequently induced input signals via the reset network 34. The switch 252 is first moved to the off position by moving the switch arms 254 to the off switch positions 255. The opening of the switch arms 254 discharges the capacitor 256 through the positive buss at the terminal 258, the various components of the control circuit of the indicator apparatus 10, and the diode 262 to ground. The indicator apparatus 10 is then turned on via moving the switch arms 254 to the on or reset switch positions 248 and 250, thereby positioning the switch 254 in the on or conducting position and discharging the sample capacitor 184 through the switch 235. The positioning of the switch 235 in the conducting position pulls the potential at the emitter of the transistor amplifier 264 down, thereby reverse biasing the transistor amplifier 264 causing the control signal generator 28 to be reset to a position wherein the transistor amplifier 226 is conducting and the transistor amplifier 224 is non-conducting. The capacitor 316 is charged to provide the operator-perceivable output indication indicating the indicator apparatus 10 has been reset for receiving subsequently induced input signals in a manner described before.

Embodiment of FIG. 4

Shown in FIG. 4 is a modified transducer 12a having a modified signal transducer 16a, a modified low pass filter network 20a and a modified meter network 44a, which can be incorporated in part or in whole in the indicator apparatus 10 of FIGS. 1 through 3, described before, only those portions of the indicator apparatus 10 necessary to explain the modified portions have been shown in FIG. 4 for the purpose of clarity of description. The modified transducer 12a, more particularly, includes a modified magnet 66a, the modified magnet 66a being more particularly the meter 310a magnet utilized to deflect the meter needle 334, the meter 310a magnet being thus utilized to deflect the meter needle 334 and simultaneously being utilized to produce the magnetic field for the transducer 12a, which may be more desirable and economical in some applications.

As shown in FIG. 4, a compensating coil 410 and a compensating coil 412 are connected between the transducer 12a and the low pass filter network 20a, as schematically shown in FIG. 4. In practice, the coil 410 is more particularly connected to one side of the loop 72 and the other coil 412 is more particularly connected to the opposite side of the loop 72 such that each compensating coil 410 and 412 receives and induces signals in the transducer 12 in a direction generally electrically opposed to the signals induced in the loop 72. In this manner, low amplitude noise or extraneous noise signals induced in the loop 72 are also induced in the compensating coils 410 and 412 and cancelled thereby, the compensating coils 410 and 412 thus providing additional, augmenting apparatus for reducing the introduction of noise and extraneous signals into the control circuit of the indicator apparatus 10 via the transducer 12a.

In lieu of the resistors 90 and 92, as shown schematically in FIG. 1, the modified low pass filter network 20a includes a core assembly 400 having a core 402. The core 402 receives the pair of signal carrying conductors, each conductor being identically wound in one direction about the core 402 and electrically connected such that the junctions 86 and 88 are connected to similar ends and the junctions 94 and 96 are connected to the other pair of similar ends. The core 402 and the wound conductor portions 404 and 406 constitute what is referred to in the art as a bifilar wound torroidal ferrite core, the core assembly 400 having a relatively high impedance with respect to common mode signals received thereby and a relatively low impedance with respect to differential signals received thereby.

Embodiment of FIG. 5

Shown in FIG. 5 is a portion of a modified meter network 44b, the meter network 44b being constructed similar to the meter network 44 described in detail before, the salient difference being that the meter network 44b includes an additional feedback network 420 connected in parallel with the feedback resistor 330. The feedback network 420 includes a switch 422 connected in series with a resistor 424 and a pair of diodes 426 and 428, the diodes 426 and 428 being connected in parallel and reversed oriented. The switch 422 allows the additional feedback network 420 to be switched into the meter network 44b for decreasing the sensitivity except at the null position of the meter 310 connected to the output of the operational amplifier 308, which may be desirable in some applications.

Embodiment of FIGS. 6 and 7

Shown in FIGS. 6 and 7 is a modified transducer 12c and a modified support 52c for removably receiving and connecting the loop 72c of the transducer 12c to the low pass filter network 20 of the indicator apparatus 10, shown in FIG. 1, via the plug type connectors 50, in a manner similar to that described before with respect to the transducer 12 and a support 52 of the indicator apparatus 10, as shown in FIGS. 2 and 3. The modified transducer 12c includes a loop support 500 constructed of a semi-rigid, foldable material, having opposite ends 502 and 504 and opposite sides 506 and 508.

A pair of fold lines 510 and 512 are formed in the loop support 500, the loop support 500 being foldable generally along the fold lines 510 and 512. The sides 506 and 508 are each tapered outwardly from each of the ends 502 and 504 such that a portion of the loop support 500, generally between the ends 502 and 504 thereof, has a larger width as compared to the width of the loop support 500 generally at each of the ends 502 and 504. Each of the fold lines 510 and 512 extend angularly outwardly from the end 504 of the loop support 500.

The modified loop 72c includes a portion extending generally between the fold lines 510 and 512 and another portion extending beyond the end 502 of the loop support 500, the active section 76c of the loop 72c being formed generally beyond the end 502 of the loop support 500. The ends of the loop 72c generally opposite the active section 76c end thereof are each extended a distance toward one of the sides 506 and 508, each end portion extending over and beyond one of the fold lines 510 and 512. The loop 72c is secured to the loop support 500 in an assembled position, as shown in FIG. 6, such that the modified transducer 12c including the loop support 500 and the loop 72c lie in a substantially flat plane formed by the loop support 500, the transducer 12c thus being constructed to be stored and shipped in a more convenient and more economical manner.

When the loop support 500 is folded generally along the fold lines 510 and 512 to a folded position, as shown in FIG. 7, the passive section 74c of the loop extends generally between the two fold lines 510 and 512 and along the surface of the loop support 500, generally between the two fold lines 510 and 512, and the active section 76c end of the loop 72c extends beyond the end 502 of the loop support 500. The end 504 of the loop support 500 is shaped to be removably inserted in a portion of the modified support 52c. A portion of each end of the loop 72c, opposite the end 78c of the loop 72c, extends over a portion of the surface formed by the loop support 500; one of the ends extending generally between the fold line 510 and the side 506 and the other end extending generally between the fold line 512 and the side 508.

The modified support 52c is constructed similar to the modified support 52, shown in FIGS. 2 and 3, but includes a transducer housing 514 formed on one end of the support 52c. A pair of transducer support openings 516 and 518 are formed through a portion of the transducer housing 514, each of the transducer support openings 516 and 518 being shaped to receive a portion of the transducer 12c, generally near the end 504 of the loop support 500.

In the assembled position of the transducer 12c and the support 52c, the end 504 portion of the transducer 12c is inserted through a portion of one of the transducer support openings 516 or 518 to a position wherein the end of the loop 72c extending generally between the fold line 510 and the side 506 contacts one of the surfaces of the transducer support opening 516 or 518 and the end of the loop 72c extending generally between the fold line 512 and the side 508 contacts the opposite surface of the transducer support opening 516 and 518. The surfaces of the transducer support openings 516 and 518 are constructed or coated with an electrically conductive material, in a manner similar to that mentioned before with respect to the support 52, such that the engagement between the ends of the loop 72c, opposite the active section 76c end thereof and the surfaces of the transducer support openings 516 and 518 establishes electrical continuity between the loop 72c of the transducer 12c and the control circuitry of the indicator apparatus via the support 52c, in a manner similar to that described before with respect to the transducer 12 and the support 52.

As shown in FIG. 7, the end 504 of the loop support 500 is removably insertable within either transducer support opening 516 or 518 and positionable such that the active section 76c end of the loop 72c is angularly extended in predetermined, selected directions, in a manner similar to that described before with respect to the transducer 12, this feature being particularly desirable with respect to a golf club velocity indicating apparatus wherein the indicator apparatus is constructed to be utilized via a right-handed and a left-handed golfer by merely re-orienting the transducers with respect to the supports therefor. It should be noted that the transducer support openings 516 and 518 are connected electrically opposite to the control circuit of the indicator apparatus 10 to maintain the polarity at the input junctions 86 and 88 constant and yet accommodate the different swing direction.

Embodiment of FIGS. 8 and 9

Shown in FIGS. 8 and 9 is another modified transducer 12d, constructed similar to the modified transducer 12c, shown in FIGS. 6 and 7 and described in detail before. The modified transducer 12d includes a modified loop support 500d, constructed similar to the loop support 500, the salient difference being that the end 502d of the loop support 500d extends beyond and provides a surface for supporting the active section 76d end of the loop 72d, as shown in FIGS. 8 and 9, the loop support 500d including an additional fold line 520 positioned so that the end 502d portion of the loop support 500d can be folded generally along the fold line 520 to form the angularly extending active section 76d end of the loop 72d in a folded, assembled position of the modified transducer 12d.

The loop support 500d also includes a pair of openings 522 and 524 extending therethrough. One portion of the loop 72d extends along one side of the modified support 500d, generally between the fold lines 510d and 512d, one end of the loop 72d being extended over the fold line 510d a distance generally toward the side 506d for contacting a portion of the transducer housing 514 formed by the transducer support openings 516 and 518, in a manner similar to that described before with respect to the transducer 12c. The end of the loop 72d opposite the end portion thereof extending between the fold line 510d and the side 506d being disposed through the opening 522 and extended along the surface of the loop support 500d, generally opposite the surface supporting the first-mentioned portion of the loop 72d, as shown in FIG. 8. As shown more clearly in FIG. 9, the end portion of the loop 72d extending through the opening 522 extends along the surface of the loop support 500d generally between the fold lines 510d and 512d forming an additional, active section 76d and additional passive sections 74d, the end of the loop 72d being then extended through the opening 524 and across a portion of the loop support 500d between the fold line 512d and the side 508d, as shown in FIG. 8. In this manner, the loop support 500d is constructed to support two portions of the loop 72d; that is, two active sections 76d of the loop 72d connected in series. The modified transducer 12d and the modified loop support 500d will thus function in a manner similar to that described before with respect to the transducer 12c and the loop support 500, the transducer 12d and the loop support 500d providing a transducer construction having two active sections connected in series, which may be desirable in some applications.

Embodiment of FIG. 10

Shown in FIG. 10 is another modified transducer 12e constructed similar to the transducers 12c and 12d, shown in FIGS. 6 through 9 and described in detail before, the transducer 12e including a loop support 500e constructed exactly like the loop support 500d, shown in FIGS. 8 and 9, except the loop support 500e does not include the openings 522 and 524 formed therethrough, as shown in FIGS. 8 and 9. The modified loop 72e, including the passive section 74e and the active section 76e, is formed via a conductive paint or the like on the one surface of the loop support 500e in lieu of the wire-conductor shaped loops 72, 72c and 72d, described in detail before, the conductive paint or the like construction of the loop 72e being preferable in some applications.

Figure 11:
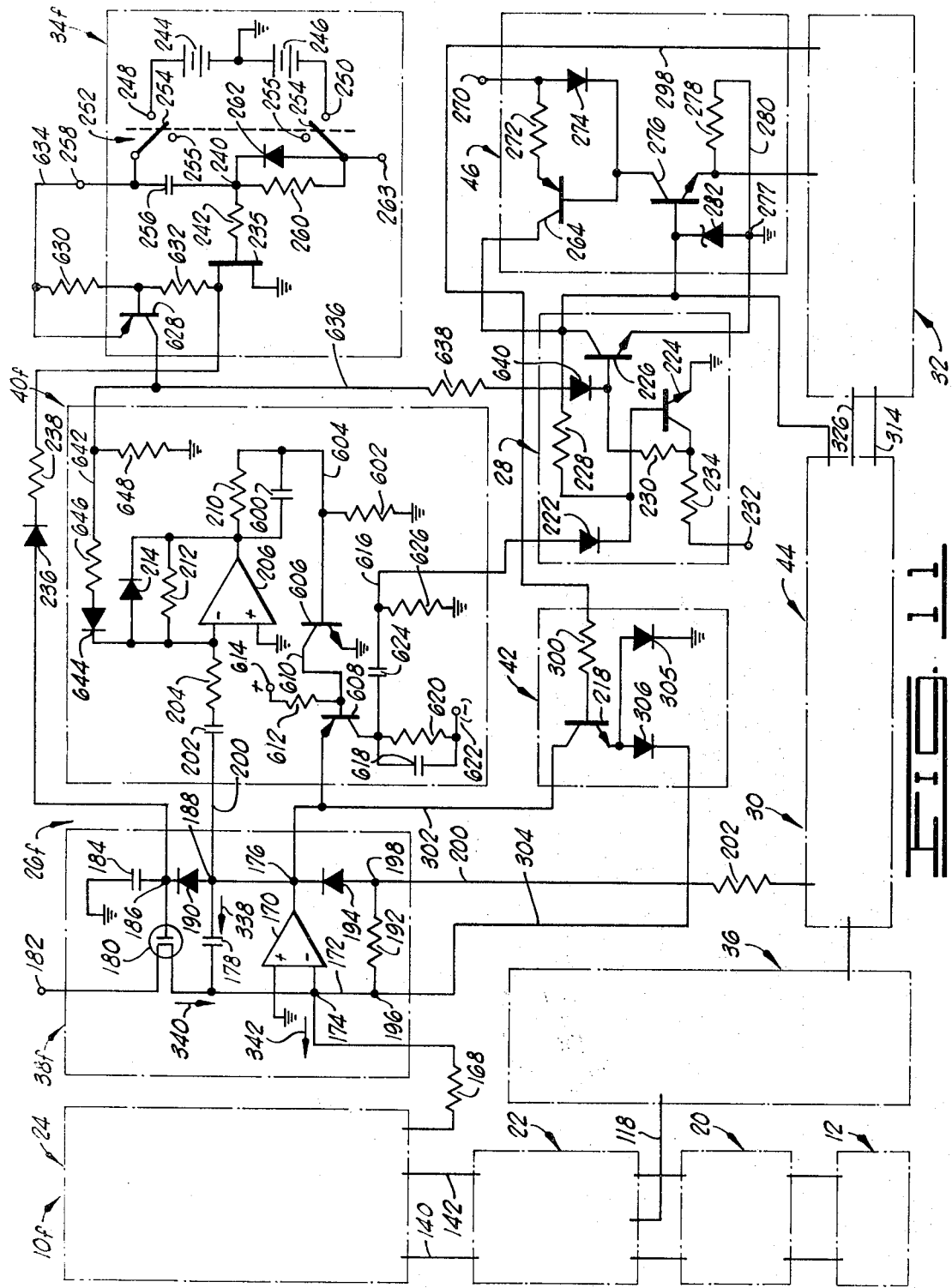
FIG. 11 is a partial, schematic view showing a portion of a modified indicator apparatus.

Embodiment of FIG. 11

Shown in FIG. 11 is a partial, schematic view of a modified indicator apparatus 10f constructed similar to the indicator apparatus 10 described before and schematically shown in FIG. 1, only those portions of the control circuit of the indicator apparatus 10f considered necessary to illustrate the differences shown in FIG. 11 for the purpose of clarity of description. The indicator apparatus 10f includes a modified delay and sample network 26f and a modified reset network 34f.

The delay and sample network 26f includes a modified peak detector 38f and a modified trigger signal generator 40f. The trigger signal generator 40f includes a capacitor 600 connected in parallel with the resistor 210 and a resistor 602 connected to a conductor 604 and to ground, the conductor 604 being connected to the output signal of the operational amplifier 206 via the resistor 210 and the capacitor 600.

The output signal of the operational amplifier 206 is, more particularly, connected to the base of a transistor amplifier 606. The emitter of the transistor amplifier 606 is connected to ground and the collector of the transistor amplifier 606 is connected to the base of a transistor amplifier 608 via a conductor 610. A resistor 612 is connected to the conductor 610 and to a terminal 614 connected to the positive power supply of the indicator apparatus 10f. The emitter of the transistor amplifier 608 is connected to the junction 176 of the peak detector 38f via the conductor 302. The collector of the transistor amplifier 608 is connected to the diode 222 via a conductor 616, the collector being more particularly connected to the control signal generator 28 via the conductor 616 and the diode 222.

A capacitor 618 connected in parallel with a resistor 620 is connected to the collector of the transistor amplifier 608 and to a terminal 622 connected to the negative power supply of the indicator apparatus 10f. A capacitor 624 is interposed in the conductor 616 between the collector of the transistor amplifier 608 and a resistor 626 is connected to the conductor 616 between the capacitor 624 and the diode 222 and to ground, as shown in FIG. 11.

The modified reset network 34f includes a transistor amplifier 628, the base of the transistor amplifier 628 being connected between a pair of resistors 630 and 632. The resistor 630 is connected to the positive power supply at the terminal 258 via a conductor 634 and the resistor 632 is connected to the source side of the switch 235 between the diode 236, the resistor 238 and the switch 235.

The emitter of the transistor amplifier 628 is connected to the positive power supply at the terminal 258, the emitter being connected to the connection of the conductor 634 to the resistor 630. The collector of the transistor amplifier 628 is connected to the base of the transistor amplifier 226 of the control signal generator 28 via a conductor 636, a resistor 638 and a diode 640 being interposed in the conductor 636. The collector of the transistor amplifier 628 is also connected to the feedback network of the trigger signal generator 40f via a conductor 642, the conductor 642 being connected at the connection between the conductor 636 and the collector of the transistor amplifier 628 and at the connection between the diode 214, the resistor 212 and the inverting input of the operational amplifier 206, as shown in FIG. 11. A diode 644 and a resistor 646 are interposed in the conductor 642 and a resistor 648 is connected to the conductor 642 between the diode 644, the resistor 648 and the connection of the conductor 636 to the collector of the transistor amplifier 628, the resistor 648 also being connected to ground.

In summary, the transistor amplifier 628, the resistors 630, 632, 638, 646 and 648, the conductors 634, 636 and 642, and the diodes 640 and 644 comprise the modified portion of the reset network 34f, the resistor 268 connecting the switch 235 to the transistor amplifier 264 of the reference network 46 of the indicator apparatus 10, shown in FIG. 1, being eliminated in the indicator apparatus 10f, shown in FIG. 11. The connection between the operational amplifier 206 and the junction 176 of the peak detector 38 and between the operational amplifier 206 and the control signal generator 28 of the indicator apparatus 10, shown in FIG. 1, are replaced via the transistor 606 and 608 and the various components connected generally thereto, as shown in FIG. 11.

The indicator apparatus 10f will operate similar to the indicator apparatus 10, described before. When the indicator apparatus 10f is initially switched to the on or reset position by moving the switch arms 254 to the on switch positions 248 and 250, the sample capacitor 184 is discharged to ground via the switch 235, in a manner like that described before with respect to the indicator apparatus 10. The transistor amplifier 628 biased in the on or conducting position, thereby biasing the transistor amplifier 226 in the on or conducting position resetting the control signal generator 28, for reasons described before with respect to the indicator apparatus 10. The output signal of the operational amplifier 206 is low and the transistor amplifiers 606 and 608 are each biased in the off or non-conducting position.

After the indicator apparatus 10f has been reset or at the end of the reset portion of the operation of the indicator apparatus 10f, the switch 235 and the transistor amplifier 628 are each biased in the off or non-conducting position and the diodes 236, 644 and 640 are each reverse biased or open, the transistor amplifier 226 being biased in the on or conducting position by the positive power supply connected thereto via the terminal 232 and the resistors 234 and 230 and to ground via the connection of the emitter of the transistor amplifier 226 to ground.

When an input signal is induced in the control circuit of the indicator apparatus 10f via the transducer 12 and initially received by the delay and sample network 26f, the peak detector 38f will begin integrating the received amplifier network 24 output signal, the integrated signal swinging the voltage level at the junction 176 in a positive-going direction. Initially, the integrated signal at the junction 176 connected to the inverting input of the operational amplifier 206 is not of a sufficient level to switch the state of the operational amplifier 206 of the trigger signal generator 40f from a low to a high state for generating the trigger signal. Thus, the transistor amplifiers 606 and 608 are each biased in the off or non-conducting position, and the transistor amplifier 218 of the hold network 42 is also biased in the off or non-conducting position.

As the voltage level at the junction 176 of the peak detector 38f continues to swing in the positive-going direction to a level less than the second predetermined level, the operational amplifier 206 output signal will be positive biasing the transistor amplifier 606 in the on or conducting position. However, assuming the voltage level at the junction 176 does not rise to the second predetermined level activating the control circuit of the indicator apparatus 10f to sample the induced input signal, the transistor amplifier 608 will remain biased in the off or non-conducting position.

When the integrated signal at the junction 176 of the peak detector 38f initially reaches the second predetermined level, the transistor amplifiers 606 and 608 are each biased in the on or conducting position, the PNP type of transistor amplifier 608 being connected to the junction 176 and operating relatively rapidly to pull the voltage level at the junction 176 in a negative-going direction. In the on or conducting position of the transistor amplifier 608, current is generally conducted through the transistor amplifier 608, through the conductor 616 and to ground via the emitter of the transistor amplifier 224 of the control signal generator 28 biasing the transistor amplifier 224 in the on or conducting position.

The clamping of the junction 176 via the transistor amplifier 608 in a relatively rapid manner causes the inverting input of the operational amplifiers 170 and 206 to drop below a zero voltage level resulting in a tendency of the output signals of each of the operational amplifiers 170 and 206 to move in a positive-going direction. The output signal from the operational amplifier 206 will swing in a positive-going direction; however, the output signal of the operational amplifier 170 is effectively clamped by the transistor amplifier 608. As a transient state, the control circuit of the indicator apparatus 10f is essentially held in this position until the capacitors 178 and 202 are charged. Thus, a continuous positive pulse is applied to the transistor amplifier 224 until the hold network 42 is activated by biasing the transistor amplifier 218 in the on or conducting position. It should be again noted that this last-described position of the indicator apparatus 10f is a transient condition existing for a relatively short period of time, the modified control circuit of the indicator apparatus 10f maintaining a stable action during this transient period of time.

After the intervening transient period of operation, the indicator apparatus 10f is positioned in the sampled position wherein the trigger signal received by the control signal generator 28 has initiated the control signal; the transistor amplifier 226 being biased in the off or non-conducting position, the transistor amplifier 218 of the hold network 42 being biased in the on or conducting position, and the reference network 46 being positioned to develop and produce the reference voltage. The sample signal is now developed generally across the resistor 192 and connected to the meter network 30, the meter network 30 providing the operator-perceivable output indications indicative of the sample signal or, in one preferred embodiment, the velocity of the moving object striking the transducer 12 in a manner similar to that described before with respect to the indicator apparatus 10.

Figure 12:
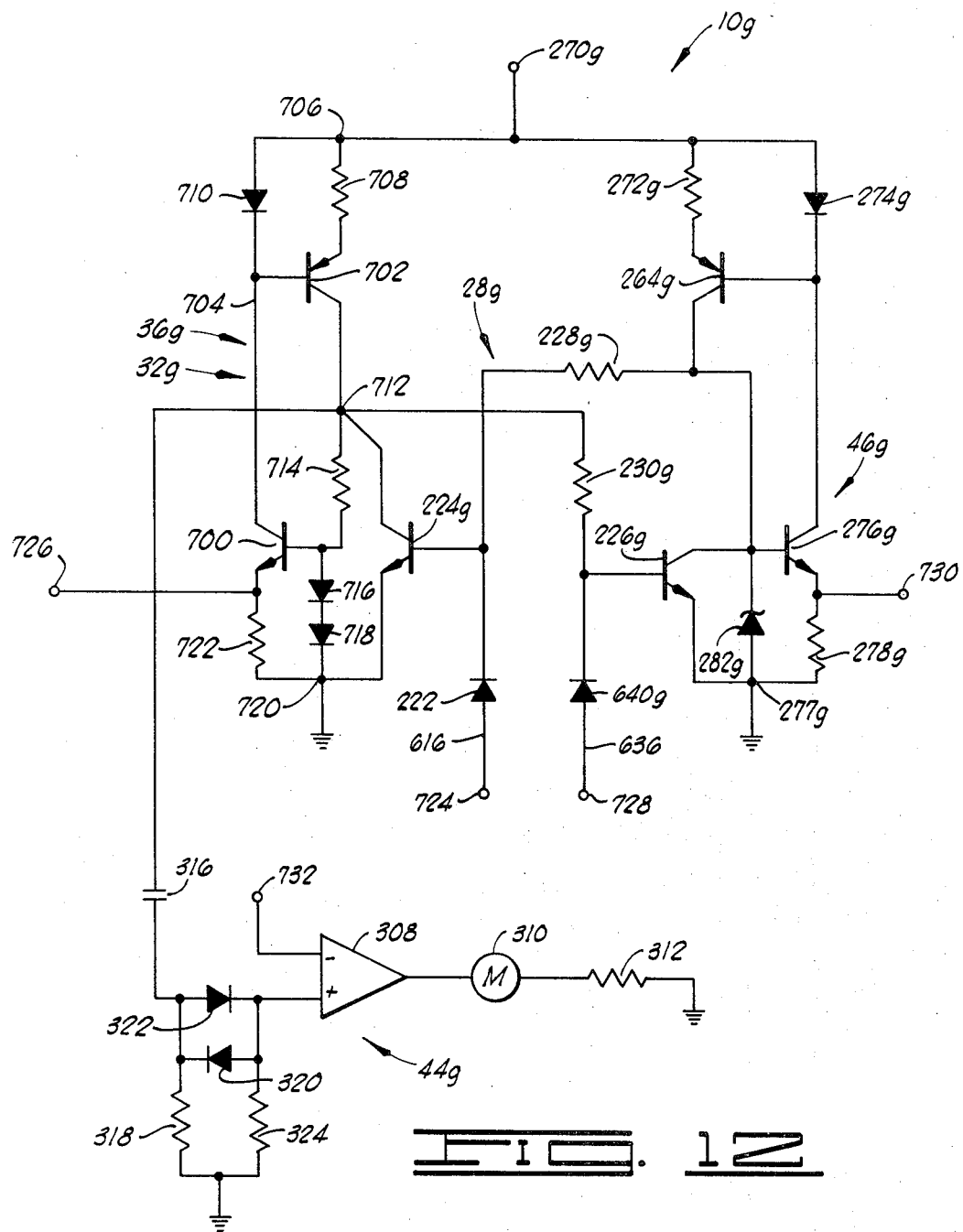
FIG. 12 is a partial, schematic view showing a portion of another modified indicator apparatus.

Embodiment of FIG. 12

Schematically and partially shown in FIG. 12 is another modified indicator apparatus 10g, or, more particularly, a portion of a modified control circuit for the indicator apparatus 10g. The indicator apparatus 10g includes a modified bias control 36g which functions to provide the operating bias to the amplifier network 24 via the active filter network 22, in a manner similar to that described before with respect to the indicator apparatus 10 of FIG. 1, and also provides in cooperation with the meter network 44g the operator-perceivable output indications indicative that the indicator apparatus 10g has been turned on or reset or that the sample signal has been developed in a manner similar to that described before with respect to sample indicator 32 of the indicator apparatus 10 of FIG. 1.

The bias control 36g includes transistor amplifier 700 and a germanium type transistor amplifier 702, the base of the transistor amplifier 702 being connected to the collector of the transistor amplifier 700 via a conductor 704. The emitter of the transistor amplifier 702 is connected to a junction 706 via a resistor 708, the junction 706 being connected to the base of the transistor amplifier 702 via a silicon type diode 710 and to the positive power supply at the terminal 270g.

The base of the transistor amplifier 700 is connected to a junction 712 via a resistor 714 and a pair of diodes 716 and 718 are connected in series to a junction 720 and to the base of the transistor amplifier 700 between the transistor amplifier 700 and the resistor 714, the junction 720 being connected to ground as shown in FIG. 12.

The emitter of the transistor amplifier 700 is connected to the junction 720 via a resistor 722 and the emitter of the transistor amplifier 224g of the control signal generator 28g is connected to the junction 720, the collector of the transistor amplifier 224g and the base of the transistor amplifier 226g each being connected to the junction 712.

The trigger signal generated and produced via the trigger signal generator 40f (shown in FIG. 11) is connected to the control signal generator 28g at the terminal 724. The bias signal generated and produced via the bias control 36g is connected to the amplifier network 24 via the active filter network 22 at the terminal 726. The reset network 34f (shown in FIG. 11) is connected to the control signal generator 28g at the terminal 728. The reference voltage developed via the reference network 46g is applied at the terminal 730 connected to the emitter of the transistor amplifier 276g, the reference voltage being connected to the negative or inverting input of the operational amplifier 308 of the meter network 44g at the terminal 732 in a manner similar to that described before with respect to the indicator apparatus 10 and 10f, shown in FIGS. 1 and 11. It should be noted that, although the trigger signal connected to the junction 724 and the connection of the reset network 34f at the junction 728 have been specifically shown in FIG. 12 with reference to the indicator apparatus 10f, shown in FIG. 11 and described before, the modified bias control 36g and sample network 32g can be incorporated in an indicator apparatus control circuit constructed similar to the indicator apparatus 10, shown in FIG. 1 and described before.

Changes may be made in the construction and the arrangement of the parts or the elements of the various embodiments as disclosed herein without departing from the spirit and the scope of the invention as defined in the following claims.

What is claimed is:

1. Indicator apparatus for providing an output indication responsive to a moving object, comprising:
    means generating an input signal, comprising:
        transducer means, having a portion engageable with the moving object and being moved a distance thereby, generating the input signal indicative of the movement of the transducer means;
    means receiving and integrating the input signal and developing a sample signal indicative of the input signal at a predetermined minimum level of the integrated input signal, including a portion sensing the integrated input signal and generating a trigger signal in response to the developed sample signal, the trigger signal being generated in response to a predetermined distance of movement of the transducer means;
    and
    means receiving the sample signal having a portion holding the sample signal and a portion receiving the trigger signal, providing an output indication indicative of the received sample signal in response to the received trigger signal.

2. The apparatus of claim 1 wherein the input signal generated via the transducer means is indicative of the velocity of the moving object and the developed signal is indicative of the velocity of the moving object.

3. The apparatus of claim 1 wherein the transducer means is defined further to include:
    means producing a magnetic field; and
    means supporting a portion of the transducer means generally within a portion of the magnetic field, the moving object striking and moving a portion of the transducer means through a portion of the magnetic field generating the input signal.

4. The apparatus of claim 3 wherein the means receiving and integrating the input signal and developing the sample signal is defined further as delaying the developing of the sample signal for a predetermined delay period of time substantially assuring a predetermined distance of movement of the portion of the transducer means through the magnetic field substantially assuring the velocity of the portion of the transducer means being moved through the magnetic field substantially corresponds to the velocity of the moving object, thereby assuring the velocity signal substantially corresponds to the velocity of the moving object.

5. The apparatus of claim 1 defined further to include:
    amplifier means interposed between the transducer means and the means receiving and integrating the input signal, the amplifier means receiving and amplifying the input signal in a biased on position thereof;
    bias control means connected to the amplifier means biasing the amplifier means in the on position in an activated position of the bias control means; and
    means receiving the trigger signal and connected to the bias control means deactivating the bias control means in response to a received trigger signal.

6. The apparatus of claim 5 defined further to include:
    active filter network means interposed between the transducer means and the amplifier means and between the bias control means and the amplifier means, the active filter network means receiving the input signal and the bias control means output signal providing a substantially high impedance to the differential input signals connected thereto from the transducer means and providing a relatively low impedance to common mode input signals and bias control means output signals connected thereto.

7. The apparatus of claim 6 wherein the active filter network means includes:
bridge network means having a pair of input-output junctions and a pair of control junctions, the input signal and the bridge network means output signal being connected to the input-output junctions; and operational amplifier means having an inverting and a noninverting input and an output, the inverting input being connected to one of the control junctions and the output being connected to the other control junction, the bias control means output signal being connected to the noninverting input of the operational amplifier means.

8. The apparatus of claim 1 defined further to include: low pass filter network means interposed between the transducer means and the means receiving and integrating the input signal, including:
a pair of conductor means carrying the input signal;

capacitor means connected between the pair of conductor means; and
bifilar wound torroidal core means, having the pair of conductor means wound thereabout, providing a relatively high impedance to common mode input signals and a relatively low impedance to differential input signals.

9. The apparatus of claim 1 wherein the transducer means is defined further to include:
means producing a magnetic field; and
means supporting a portion of the transducer means generally within a portion of the magnetic field, the moving object striking and moving a portion of the transducer means through a portion of the magnetic field generating the input signal; and
wherein the output indicator means includes: a meter having a meter needle and a meter magnet operating the movement of the meter needle; and wherein the means producing the magnetic field of the transducer means is defined further as being the meter magnet.

10. The apparatus of claim 1 defined further to include: means producing a magnetic field having magnetic field vectors extending in a predetermined direction; and wherein the transducer means is defined further to include:
a loop having an active section and a passive section constructed of a conductive material;
means supporting the loop in an assembled position, the active section extending generally perpendicularly with respect to the magnetic field vectors and the passive section extending generally parallel with respect to the magnetic field vectors, the moving object striking the active section and moving the loop through the magnetic field and causing the input signal to be induced in the loop via the movement of the active section through the magnetic field.

11. The apparatus of claim 10 wherein the end of the loop forming the active section extends a distance angularly in a direction generally toward the moving object and opposite the direction of movement of the moving object.

12. The apparatus of claim 10 wherein the means supporting the loop is defined further to include:
housing means, having connector receiving openings in electrical communication with the means receiving the input signals; and
a support having a portion removably connectable to the housing means via the connector receiving openings and a portion removably connectable to the loop supporting the loop and providing electrical communication between the loop and the means receiving the input signals; and
wherein the end of the passive sections of the loop opposite the end thereof forming the active section, are removably connectable to the support.

13. The apparatus of claim 12 defined further to include:
bag means having a flexible cover filled with a pellet-like material adjustably supporting the housing means in predetermined positions.

14. The apparatus of claim 12 wherein the support includes portions removably connectable to the loop and supporting the loop in alternate assembled positions, one assembled position wherein the angularly oriented portion extends in a direction opposed to the extending direction of the angularly oriented portion in the other assembled position.

15. The apparatus of claim 12 wherein the support means is defined further to include:
loop support means, having a pair of fold-lines, the loop being attached to the loop support means and the loop support means being removably connected to the support in a folded position of the loop support means.

16. The apparatus of claim 15 wherein the loop is constructed of a conductive material printed on the loop support means.

17. The apparatus of claim 16 wherein the transducer means is defined further to include: a pair of loops connected in series, each loop connected to the loop support means.

18. The apparatus of claim 9 defined further to include: compensating coil means connected to the transducer means to induce signals in the transducer means generally opposed to input signals induced in the portion of the transducer means disposed within the magnetic field, thereby virtually cancelling the effect of extraneous signals induced in the transducer means and connected to the means developing the sample signal.

19. Indicator apparatus providing an output indication indicative of the velocity of a moving object, along a predetermined path of travel, comprising:
means producing a magnetic field;
transducer means having opposite ends and an active section constructed of an electrically conductive material;
means having a portion connected to one end of the transducer means, opposite the active section portion thereof, supporting the transducer means in a position suspending the active section generally within the magnetic field and extending generally perpendicularly to the magnetic field vectors developed thereby, the active section being strikeable by the moving object and movable a distance thereby through the magnetic field inducing an input signal in the transducer means; and means connected to the transducer means receiving the input signal and producing an output indication indicative of the input signal and indicative of the velocity of the moving object.

20. The apparatus of claim 19 defined further to include: means producing a magnetic field having magnetic field vectors extending in a predetermined direction; and wherein the transducer means is defined further to include:

a loop having an active section and a passive section constructed of a conductive material;

means supporting the loop in an assembled position, the active section extending generally perpendicularly with respect to the magnetic field vectors and the passive section extending generally parallel with respect to the magnetic field vectors, the moving object striking the active section and moving the loop through the magnetic field and causing the input signal to be induced in the loop via the movement of the active section through the magnetic field.

21. The apparatus of claim 20 wherein the end of the loop forming the active section extending a distance angularly in a direction generally toward the moving object and opposite the direction of movement of the moving object.

22. Indicator apparatus providing an output indication indicative of the velocity of a moving object, along a predetermined path of travel, comprising:

means producing a magnetic field;

transducer means having an active section constructed of an electrically conductive material;

means connected to the transducer means supporting the active section of the transducer means generally within the magnetic field and extending generally perpendicularly to the magnetic field vectors developed thereby, the active section being struck by the moving object and moved a distance thereby through the magnetic field inducing an input signal in the transducer means; and means connected to the transducer means receiving the input signal and producing an output indication indicative of the input signal and indicative of the velocity of the moving object, comprising:

means receiving and integrating the input signal and developing a sample signal indicative of the input signal at a predetermined minimum level of the integrated input signal.

23. The apparatus of claim 22 defined further to include:

means receiving the sample signal having a portion holding the sample signal and providing an output indication indicative of the received sample signal.

24. The apparatus of claim 23 wherein the means receiving and integrating the input is defined further to include a portion sensing the integrated input signal and generating a trigger signal in response to the development of the sample signal; and wherein the means receiving the sample signal is defined further to include a portion receiving the trigger signal, the output indication being provided in response to the received trigger signal.

25. The apparatus of claim 24 wherein the means receiving and integrating the input signal is defined further to include:

peak detector means receiving and integrating the input signal and developing the sample signal; and trigger signal generator means receiving the integrated input signal and producing an output signal in response thereto, having a portion sensing the integrated input signal and the output signal produced in response to the received integrated input signal, the trigger signal being generated in response to a sensed predetermined level of the integrated input signal and a sensed predetermined level of the output signal produced in response to the received integrated input signal.

26. The apparatus of claim 25 wherein the trigger signal generator means is defined further to include:

differentiator means receiving the integrated input signal from the peak detector means and producing the output signal in response thereto, the output signal of the differentiator means being responsive to a negative value of the rate-of-change of the integrated input signal with respect to time.

27. The apparatus of claim 25 wherein the peak detector means is defined further to include:

inverter amplifier means receiving and inverting the input signal; and integrator capacitor means connected generally between the input and the output of the inverter amplifier means, the inverter amplifier means and the integrator capacitor means cooperating to produce the integrated input signal.

28. The apparatus of claim 27 wherein the peak detector means is defined further to include:

sample capacitor means;

diode means connecting the sample capacitor means to the integrated input signal at a predetermined level of the integrated input signal, the sample capacitor means being charged when connected to the integrated input signal;

switch means connected to the sample capacitor means biased closed and conducting a current in response to the charge on the sample capacitor means; and means receiving the current from the switch means and developing the sample signal in response thereto.

* * * * *

UNITED STATES PATENT OFFICE
CERTIFICATE OF CORRECTION

Patent No. 3,818,341　　　　　　　　Dated June 18, 1974

Inventor(s) Neal M. Burdick

It is certified that error appears in the above-identified patent and that said Letters Patent are hereby corrected as shown below:

Column 2, line 44, "varius" should be --various--.

Column 14, line 2, after the words "a diode 214," "a" should be --the--.

Column 14, line 15, "th" should be --the--.

Column 17, line 44, "384" should be --284--.

Column 19, line 25, "operation" should be --operating--.

Column 19, line 66, "156" should be --256--.

Column 19, line 67, "135" should be --235--.

Column 29, line 23, after the word "transistor", add the word --amplifiers--.

Signed and sealed this 5th day of November 1974.

(SEAL)
Attest:

McCOY M. GIBSON JR.
Attesting Officer

C. MARSHALL DANN
Commissioner of Patents